US012780033B2

(12) United States Patent
Bhunia et al.

(10) Patent No.: US 12,780,033 B2
(45) Date of Patent: Nov. 3, 2026

(54) FRAMEWORK FOR SUSTAINABLE RECHARGING OF BATTERY ELECTRIC VEHICLES WITH NEAR-PERPETUAL MOBILITY

(71) Applicant: University of Florida Research Foundation, Incorporated, Gainesville, FL (US)

(72) Inventors: Swarup Bhunia, Gainesville, FL (US); Prabuddha Chakraborty, Gainesville, FL (US); Reiner Dizon, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 853 days.

(21) Appl. No.: 18/297,436

(22) Filed: Apr. 7, 2023

(65) Prior Publication Data

US 2023/0331113 A1 Oct. 19, 2023

Related U.S. Application Data

(60) Provisional application No. 63/363,029, filed on Apr. 15, 2022.

(51) Int. Cl.

*H01M 10/46* (2006.01)
*B60L 53/35* (2019.01)

(Continued)

(52) U.S. Cl.

CPC ............. *B60L 53/665* (2019.02); *B60L 53/35* (2019.02); *B60L 53/53* (2019.02); *B60L 58/12* (2019.02);

(Continued)

(58) Field of Classification Search

CPC .. H02J 7/00; B60L 53/35; B60L 58/12; B60L 53/66; B60L 53/80; B60L 2240/62; Y02T 10/70; Y02T 10/7072

(Continued)

(56) References Cited

U.S. PATENT DOCUMENTS 9,407,105 B2 * 8/2016 Hyde ...................... B60L 53/12
9,778,653 B1 * 10/2017 McClintock ........... G06Q 10/08

(Continued)

FOREIGN PATENT DOCUMENTS

WO WO-2011014773 A2 * 2/2011 .............. H02J 7/342
WO WO-2023123932 A1 * 2/2023 .............. B60L 53/80

OTHER PUBLICATIONS

Machine translation of WO2023/123932A1 (Jul. 6, 2023) (Year: 2023).*

*Primary Examiner* — Edward Tso

(74) *Attorney, Agent, or Firm* — Alston & Bird LLP

(57) ABSTRACT

Various embodiments of the present disclosure address technical challenges related to the battery-related constraints of battery electric vehicles (BEVs). Various embodiments described herein provide an innovative framework for replenishing BEV batteries on-the-go with the help of unmanned aerial vehicles (UAVs) and mobile charging stations (MoCS). That is, various embodiments include a mobile multi-modality recharging framework including vehicles and apparatuses configured to provide and/or receive mobile multi-modality recharging, methods for performing and/or configuring mobile multi-modality recharging, computer program products for performing operations for mobile multi-modality recharging, and/or the like. Further, various embodiments described herein provide battery (Continued)

replacement systems and battery storage systems that may be implemented by a BEV or a vehicle receiving mobile multi-modality recharging.

17 Claims, 33 Drawing Sheets

(51) Int. Cl.

| | |
|---|---|
| ***B60L 53/53*** | (2019.01) |
| ***B60L 53/66*** | (2019.01) |
| ***B60L 58/12*** | (2019.01) |
| ***B64U 20/80*** | (2023.01) |
| *B64U 101/25* | (2023.01) |

(52) U.S. Cl.
CPC .......... *B64U 20/80* (2023.01); *B60L 2240/62* (2013.01); *B64U 2101/25* (2023.01)

(58) Field of Classification Search
USPC ......... 320/107, 112, 114, 115, 116, 132, 104
See application file for complete search history.

(56) References Cited

U.S. PATENT DOCUMENTS

2016/0244187 A1* 8/2016 Byers ..................... A47G 29/14
2018/0361870 A1* 12/2018 Zhao ....................... B60L 53/14

* cited by examiner

Short Range

Susceptible to Wind

Low Power Efficiency at High Speed

FRAMEWORK FOR SUSTAINABLE RECHARGING OF BATTERY ELECTRIC VEHICLES WITH NEAR-PERPETUAL MOBILITY

CROSS-REFERENCE TO A RELATED APPLICATION

This application claims the benefit of U.S. Provisional Application Ser. No. 63/363,029, filed Apr. 15, 2022, the content of which is hereby incorporated by reference in its entirety, including all figures, tables and drawings.

TECHNOLOGICAL FIELD

The present disclosure generally relates to the technical field of electric vehicles, and more specifically to a mobile multi-modality recharging framework that employs unmanned aerial vehicles (UAVs) to replenish the energy stores of electric vehicles.

BACKGROUND

It is acknowledged in the field of the present disclosure that widespread transition to battery electric vehicles (BEVs) can result in significantly positive environmental benefits. However, adoption of BEVs is vastly impeded by various battery-related challenges, such as limited travel range, long charging time, high purchasing cost (battery-induced) and lack of battery charging/re-charging infrastructure (e.g., charging stations). For example, it is very expensive to build a large infrastructure of fast charging stations that can cater to a full-scale BEV fleet. Alternative solutions, such as charging from the road and BEV-to-BEV stationary charge sharing have been proposed to counteract range anxiety, but these solutions are mostly ineffective and suffer from scalability issues. Thus, various technical challenges bar BEVs from being dominant and from being widely accepted in the field over internal combustion engine (ICE) vehicles. Through applied effort, ingenuity, and innovation, the problems identified herein have been solved by developing solutions that are included in embodiments of the present disclosure, many examples of which are described in detail herein.

BRIEF SUMMARY

Various embodiments of the present disclosure address technical challenges related to the battery-related constraints of BEVs. Various embodiments described herein provide an innovative framework for replenishing BEV batteries on-the-go with the help of UAVs and mobile charging stations (MoCS). That is, various embodiments include a mobile multi-modality recharging framework including vehicles and apparatuses configured to provide and/or receive mobile multi-modality recharging, methods for performing and/or configuring mobile multi-modality recharging, computer program products for performing operations for mobile multi-modality recharging, and/or the like. Further, various embodiments described herein provide battery replacement systems and battery storage systems that may be implemented by a BEV or a vehicle receiving mobile multi-modality recharging.

Accordingly, various embodiments enable rapid BEV battery replenishment to thereby eliminate the need for BEVs to make prolonged and pre-planned halts for recharging. As a result, various embodiments provide expanded capabilities and other technical improvements across many transportation and vehicular applications. For example, in package delivery applications, package delivery UAVs can utilize various embodiments described herein to make long-distance trips with the help of mobile charging stations and BEVs. The present disclosure includes a quantitative and simulated analysis of the effectiveness of an example mobile multi-modality recharging framework in accordance with various embodiments described herein, with the analysis demonstrating various resulting technical benefits. Through further statistical analysis, the present disclosure also shows that greenhouse gas emission (even for BEVs and UAVs) can be significantly reduced by various embodiments described herein that power MoCSs via renewable energy sources (e.g., solar).

In accordance with various embodiments of the present invention, a method for optimal on-the-go electric vehicle battery replacement for a battery electric vehicle (BEV) in a BEV network is provided. In some embodiments, the method includes identifying, using one or more processors, an unmanned aerial vehicle (UAV) network comprising one or more UAVs; determining, using the one or more processors, a selected UAV in the UAV network to pair with the BEV network; and providing, using the one or more processors, pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells.

In some embodiments, performing the automated navigation operations by the selected UAV comprises: identifying a co-trip BEV in the BEV network: (i) that has a threshold-satisfying charging state, (ii) that is traveling in a general direction associated with the travel, and (iii) whose operator has agreed to a latching pairing with the selected UAV; causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

In some embodiments, it is determined whether a charging distribution measure for the geographic region fails to satisfy a charging distribution measure threshold, and, in response to determining that the charging distribution measure for the geographic region fails to satisfy the charging distribution measure threshold, one or more mobile charging stations are redirected to the geographic region of the BEV.

In some embodiments, performing the one or more battery replacement operations by the selected UAV comprises removing the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and causing the one or more fresh battery cells to be installed into the particular battery cabinet that is in the empty battery compartment slot of the BEV. In some embodiments, installing the one or more fresh battery cells comprises inserting the one or more fresh battery cells into a common installation chute. In some embodiments, installing the one or more fresh battery cells comprises inserting each fresh battery cell into a sized installation chute that is associated with a size of the fresh battery cell. In some embodiments, performing the one or more battery replacement operations by the selected UAV comprises: removing a dead/discharged battery cabinet that is in an extraction battery compartment slot of the BEV; and causing a new battery cabinet to be installed into an insertion battery compartment slot of the BEV.

In accordance with various embodiments of the present disclosure, an apparatus for optimal on-the-go electric vehicle battery replacement for a battery electric vehicle (BEV) in a BEV network is provided. The apparatus may comprise at least one processor and at least one non-transitory memory comprising a computer program code. The at least one non-transitory memory and the computer program code may be configured to, with the at least one processor, cause the apparatus to identify an unmanned aerial vehicle (UAV) network comprising one or more UAVs; determine a selected UAV in the UAV network to pair with the BEV network; and provide pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells.

In some embodiments, performing the automated navigation operations by the selected UAV comprises: identifying a co-trip BEV in the BEV network: (i) that has a threshold-satisfying charging state, (ii) that is traveling in a general direction associated with the travel, and (iii) whose operator has agreed to a latching pairing with the selected UAV; causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

In some embodiments, it is determined whether a charging distribution measure for the geographic region fails to satisfy a charging distribution measure threshold, and, in response to determining that the charging distribution measure for the geographic region fails to satisfy the charging distribution measure threshold, one or more mobile charging stations are redirected to the geographic region of the BEV.

In some embodiments, performing the one or more battery replacement operations by the selected UAV comprises removing the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and causing the one or more fresh battery cells to be installed into the particular battery cabinet that is in the empty battery compartment slot of the BEV. In some embodiments, installing the one or more fresh battery cells comprises inserting the one or more fresh battery cells into a common installation chute. In some embodiments, installing the one or more fresh battery cells comprises inserting each fresh battery cell into a sized installation chute that is associated with a size of the fresh battery cell. In some embodiments, performing the one or more battery replacement operations by the selected UAV comprises: removing a dead/discharged battery cabinet that is in an extraction battery compartment slot of the BEV; and causing a new battery cabinet to be installed into an insertion battery compartment slot of the BEV.

In accordance with various embodiments of the present disclosure, a computer program product for optimal on-the-go electric vehicle battery replacement for a battery electric vehicle (BEV) in a BEV network is provided. The computer program product may comprise at least one non-transitory computer-readable storage medium having computer-readable program code portions stored therein. The computer-readable program code portions may comprise an executable portion configured to identify an unmanned aerial vehicle (UAV) network comprising one or more UAVs; determine a selected UAV in the UAV network to pair with the BEV network; and provide pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells.

In some embodiments, performing the automated navigation operations by the selected UAV comprises: identifying a co-trip BEV in the BEV network: (i) that has a threshold-satisfying charging state, (ii) that is traveling in a general direction associated with the travel, and (iii) whose operator has agreed to a latching pairing with the selected UAV; causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

In some embodiments, it is determined whether a charging distribution measure for the geographic region fails to satisfy a charging distribution measure threshold, and, in response to determining that the charging distribution measure for the geographic region fails to satisfy the charging distribution measure threshold, one or more mobile charging stations are redirected to the geographic region of the BEV.

In some embodiments, performing the one or more battery replacement operations by the selected UAV comprises removing the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and causing the one or more fresh battery cells to be installed into the particular battery cabinet that is in the empty battery compartment slot of the BEV. In some embodiments, installing the one or more fresh battery cells comprises inserting the one or more fresh battery cells into a common installation chute. In some embodiments, installing the one or more fresh battery cells comprises inserting each fresh battery cell into a sized installation chute that is associated with a size of the fresh battery cell. In some embodiments, performing the one or more battery replacement operations by the selected UAV comprises: removing a dead/discharged battery cabinet that is in an extraction battery compartment slot of the BEV; and causing a new battery cabinet to be installed into an insertion battery compartment slot of the BEV.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Having thus described the present disclosure in general terms, reference will now be made to the accompanying drawings, which are not necessarily drawn to scale.

Figure 1A:
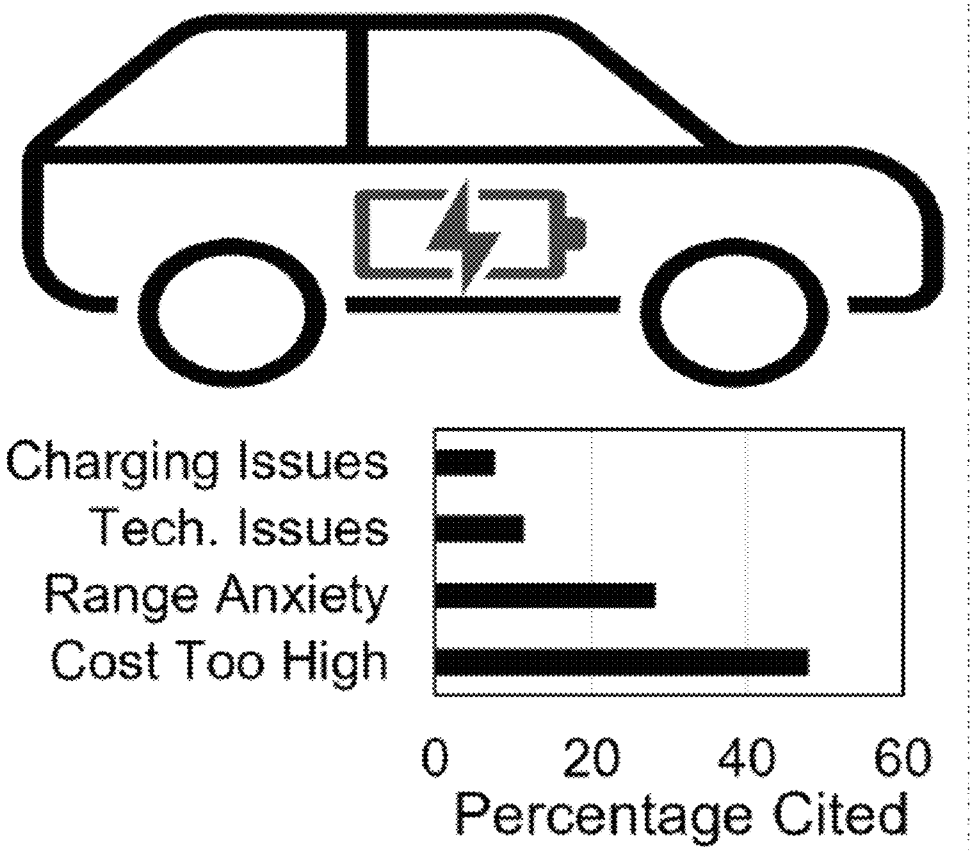

FIG. 1A identifies technical challenges related to the adoption of BEVs over internal combustion engine vehicles in accordance with some embodiments of the present invention.

Figure 1B:
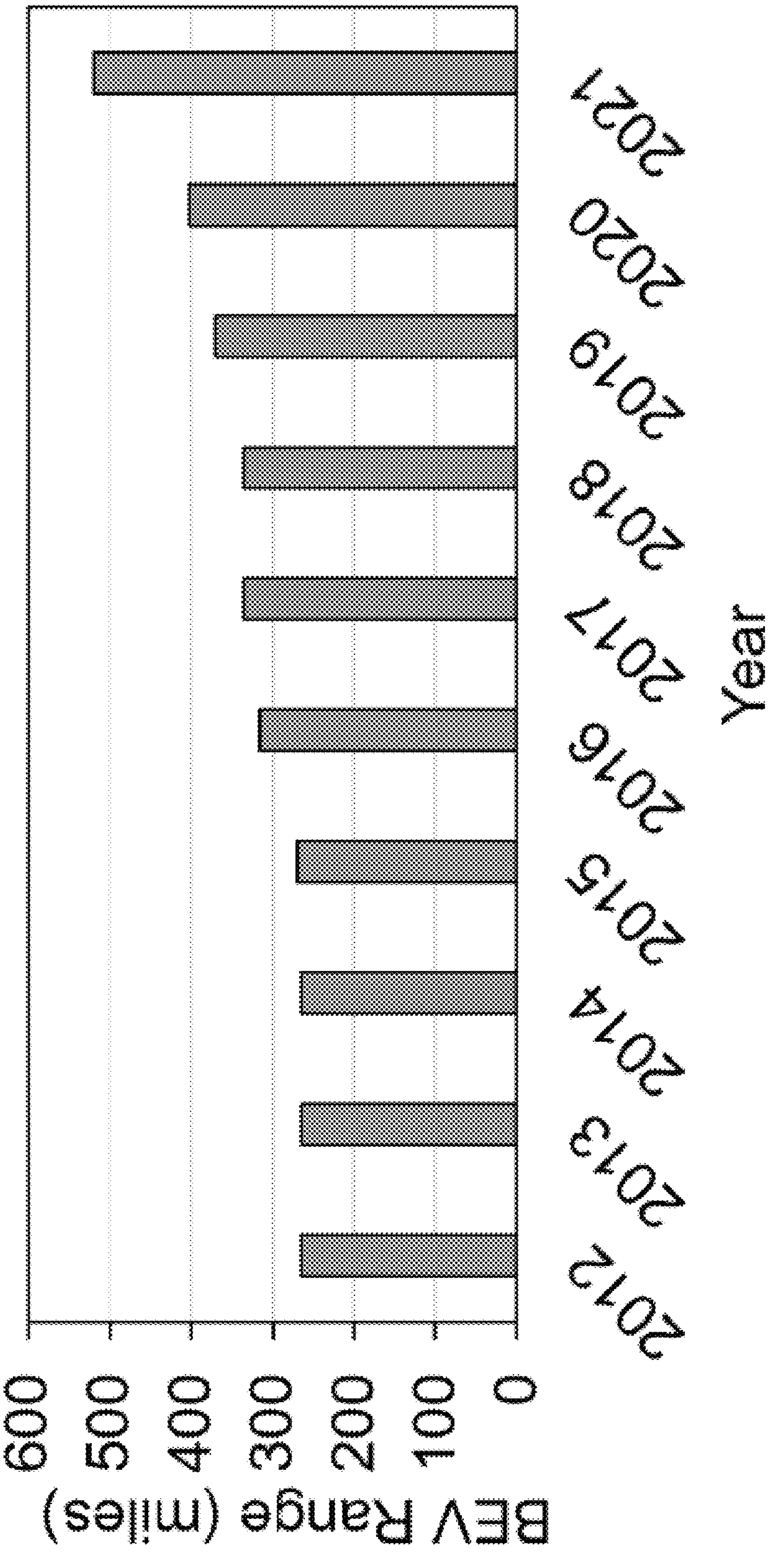

FIG. 1B provides data demonstrating limited benefits and success resulting from existing systems and solutions in accordance with some embodiments of the present invention.

Figure 1C:
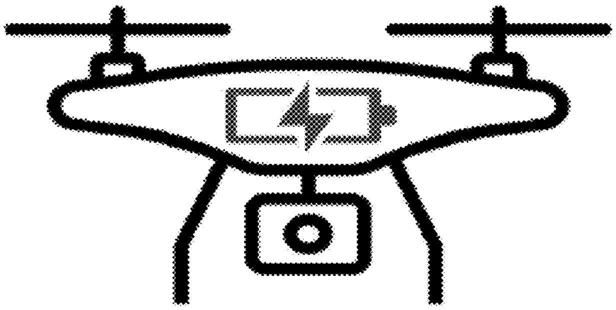

FIG. 1C identifies further technical challenges related to battery electric vehicles, and specifically air-based BEVs such as UAVs in accordance with some embodiments of the present invention.

Figure 2:
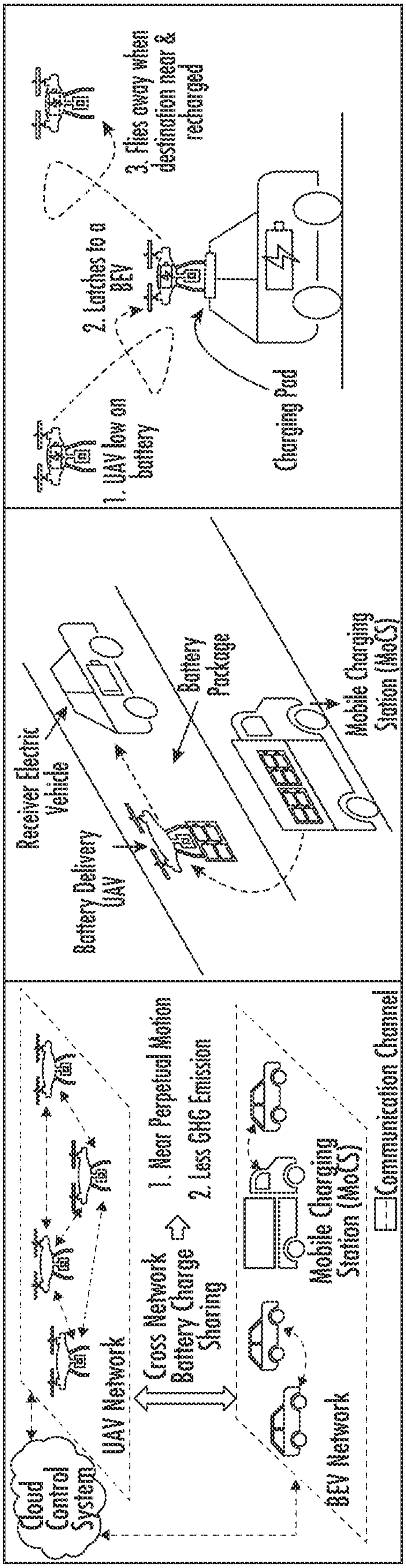

FIG. 2 provides an operational example of major components of a sustainable autonomous vehicle network (SAVIOR) framework in accordance with some embodiments of the present invention.

Figure 3:
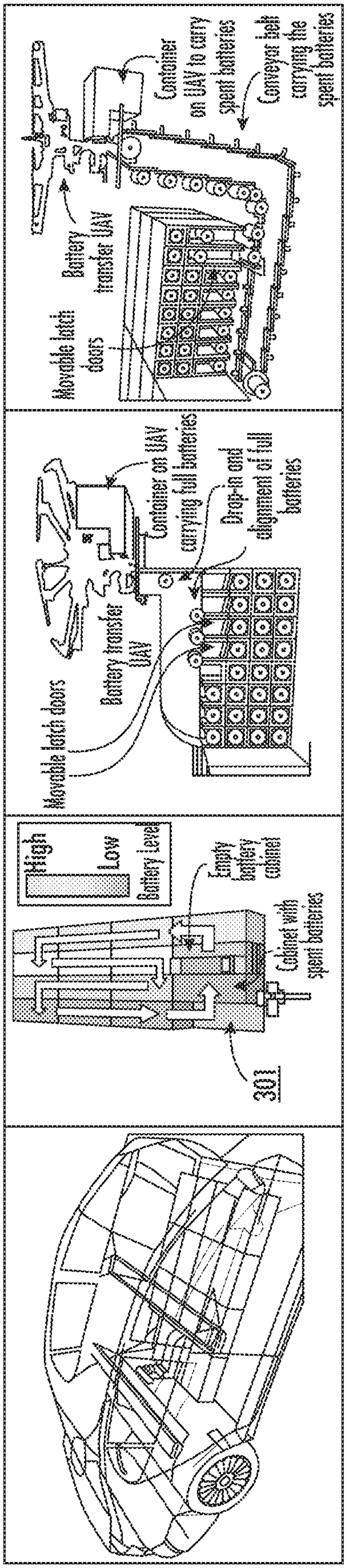

FIG. 3 provides an operational example of battery replenishment/removal by a UAV in accordance with some embodiments of the present invention.

Figure 4:
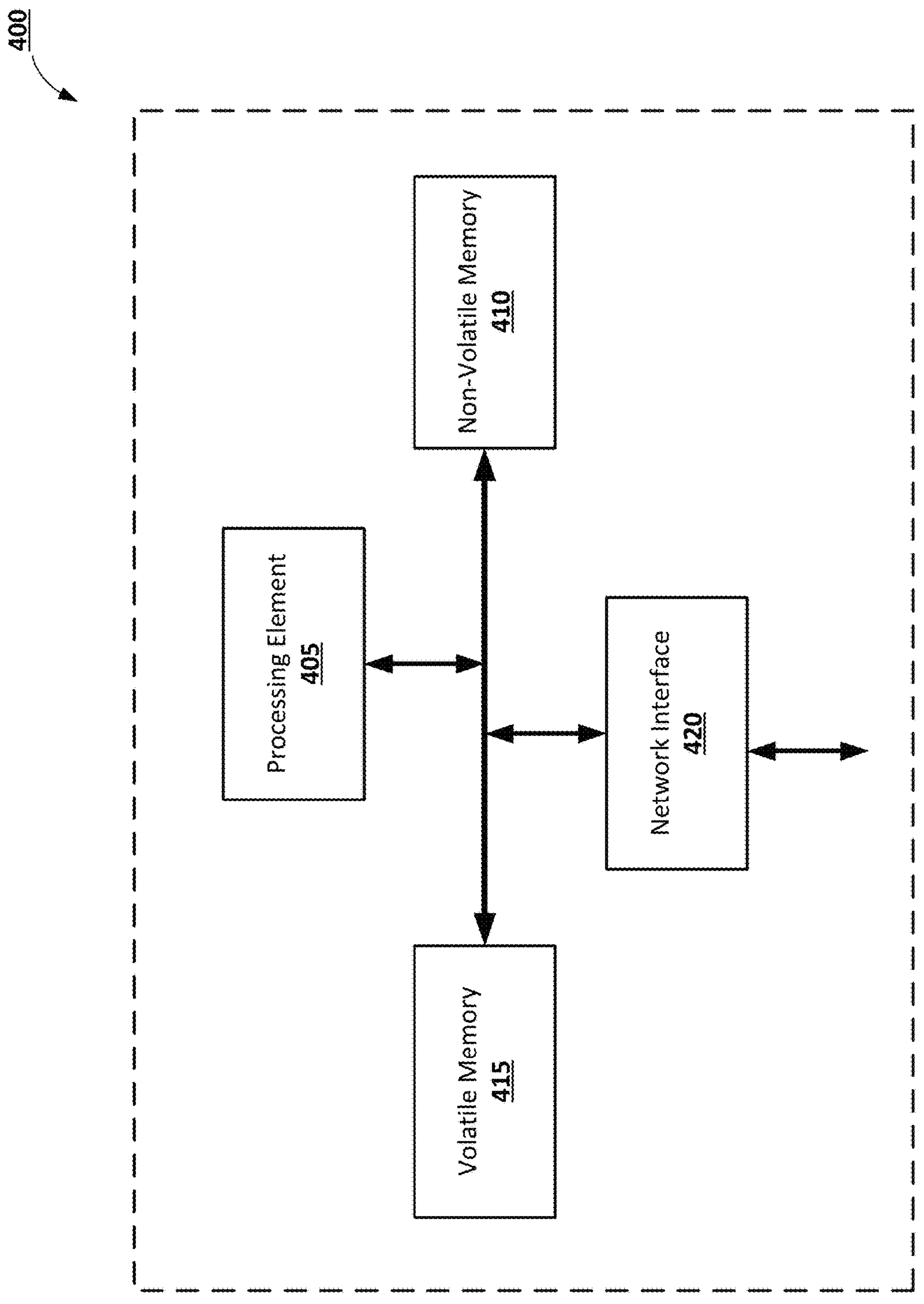

FIG. 4 provides a schematic of an exemplary computing entity in accordance with some embodiments of the present invention.

Figure 5A:
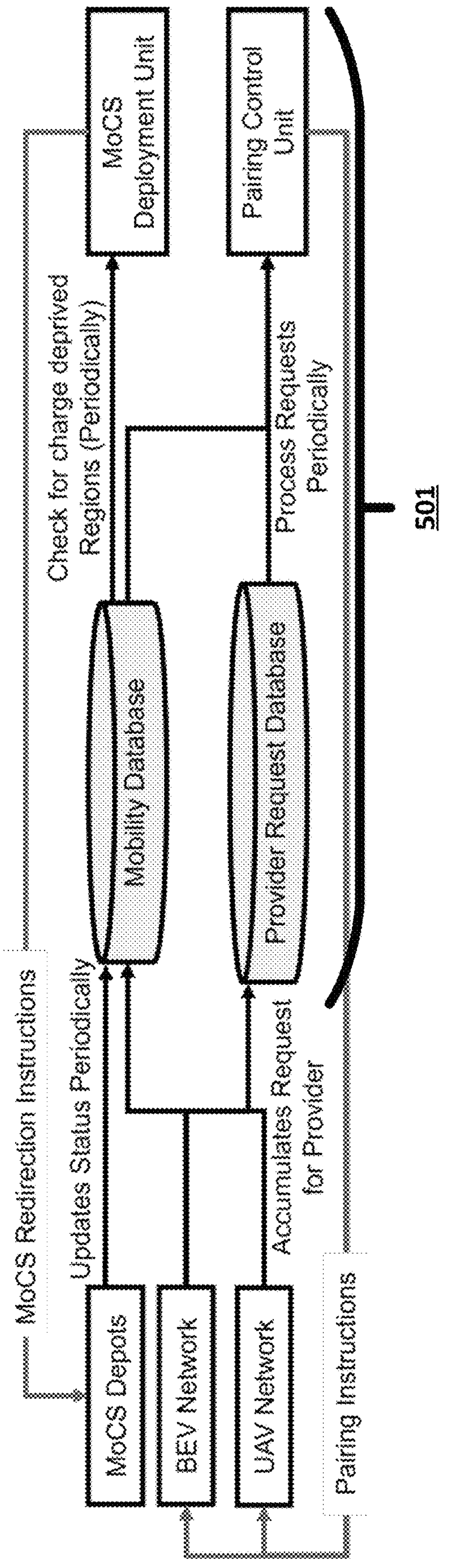

FIG. 5A provides an operational example of a cloud-based control system of a SAVIOR framework in accordance with some embodiments of the present invention.

Figure 5B:
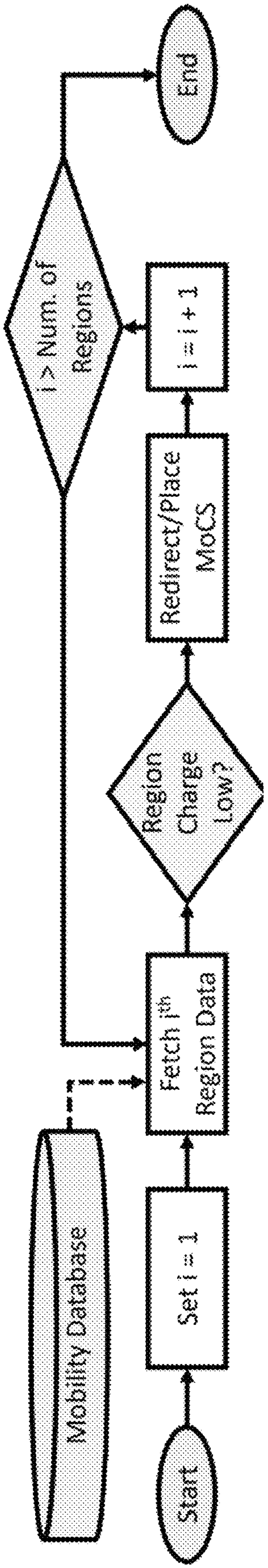

FIG. 5B provides an exemplary process for determining whether to redirect mobile charging stations (MoCSs) to a particular region in accordance with some embodiments of the present invention.

Figure 5C:
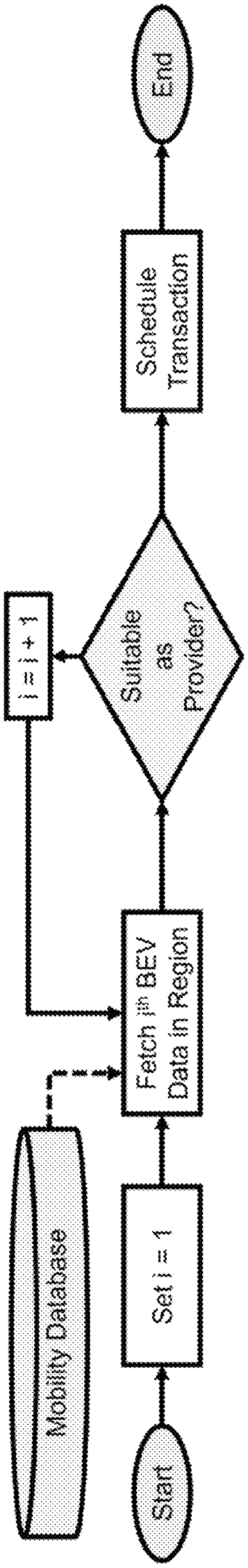

FIG. 5C provides an exemplary for determining which BEV to assign to a UAV in accordance with some embodiments of the present invention.

Figure 6:
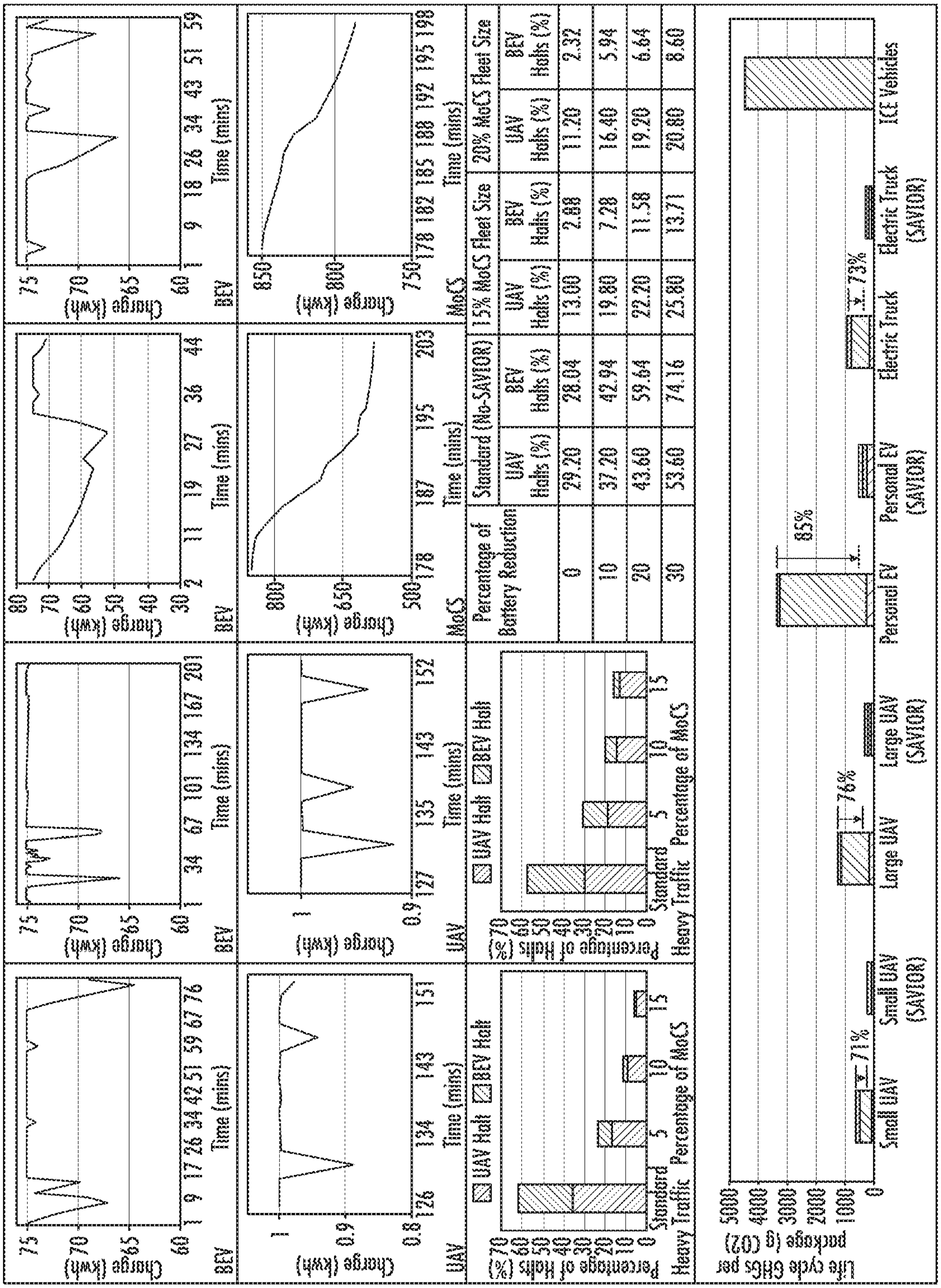

FIG. 6 provides results of simulating the SAVIOR framework using a Simulation of Urban Mobility (SUMO) simulator in accordance with some embodiments of the present invention.

Figure 7A:
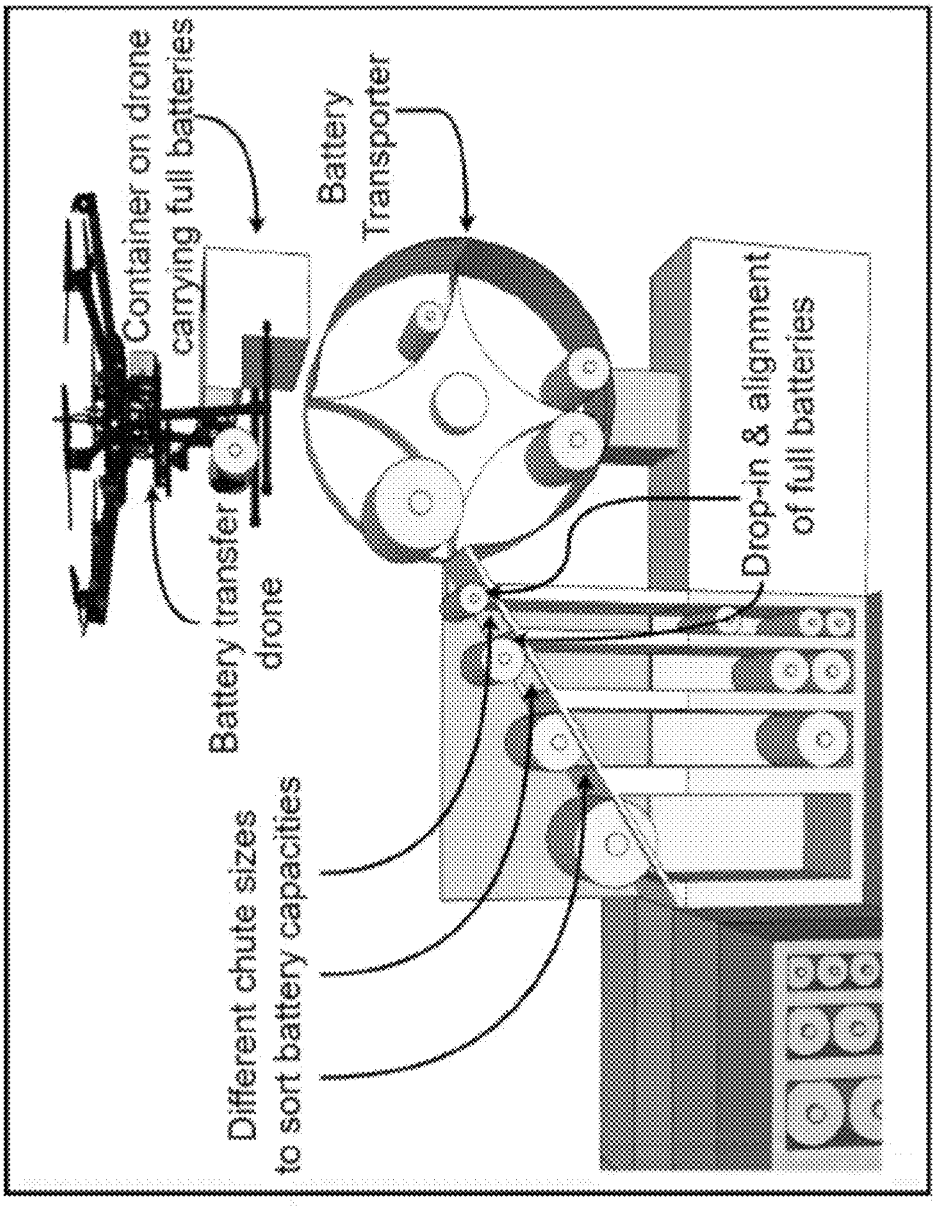

FIG. 7A provides an operational example of a battery loading process of a non-uniform battery cell replacement system in accordance with some embodiments of the present invention.

Figure 7B:
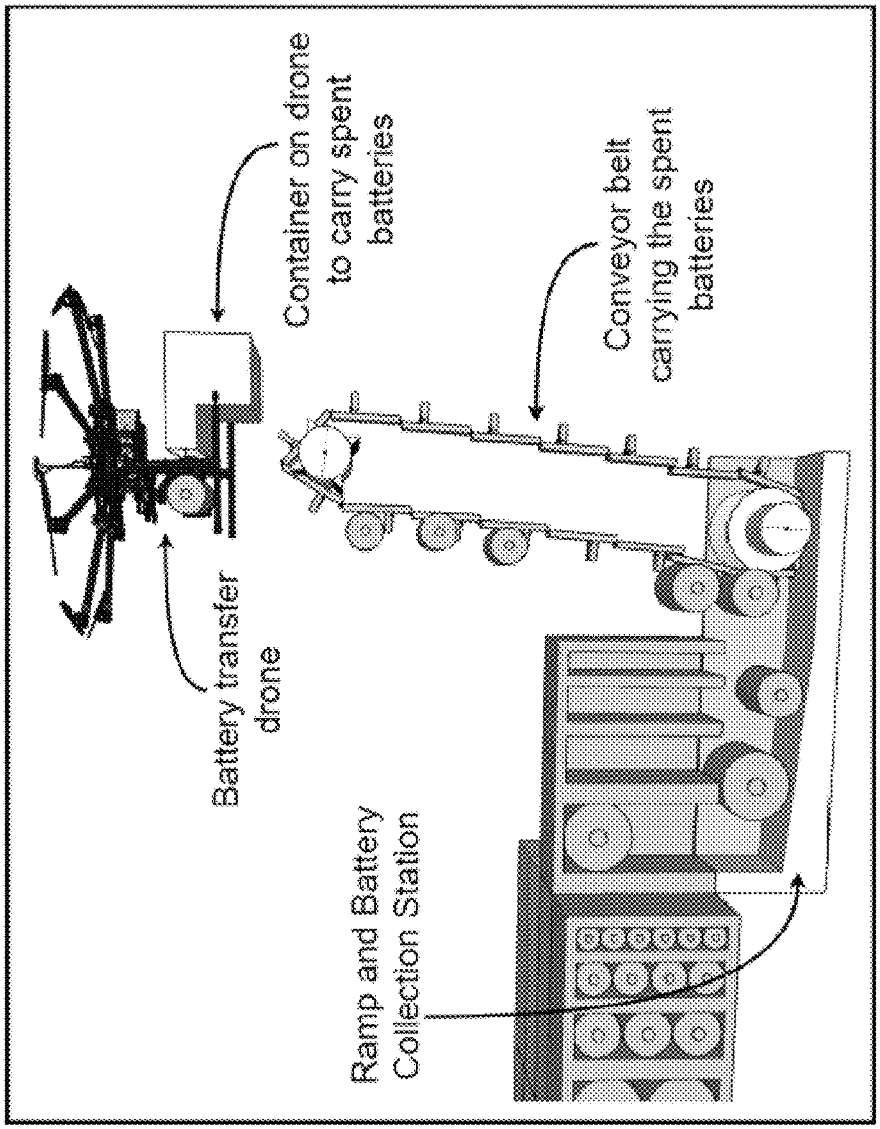

FIG. 7B provides an operational example of a battery unloading process of a non-uniform battery cell replacement system in accordance with some embodiments of the present invention.

Figure 8:
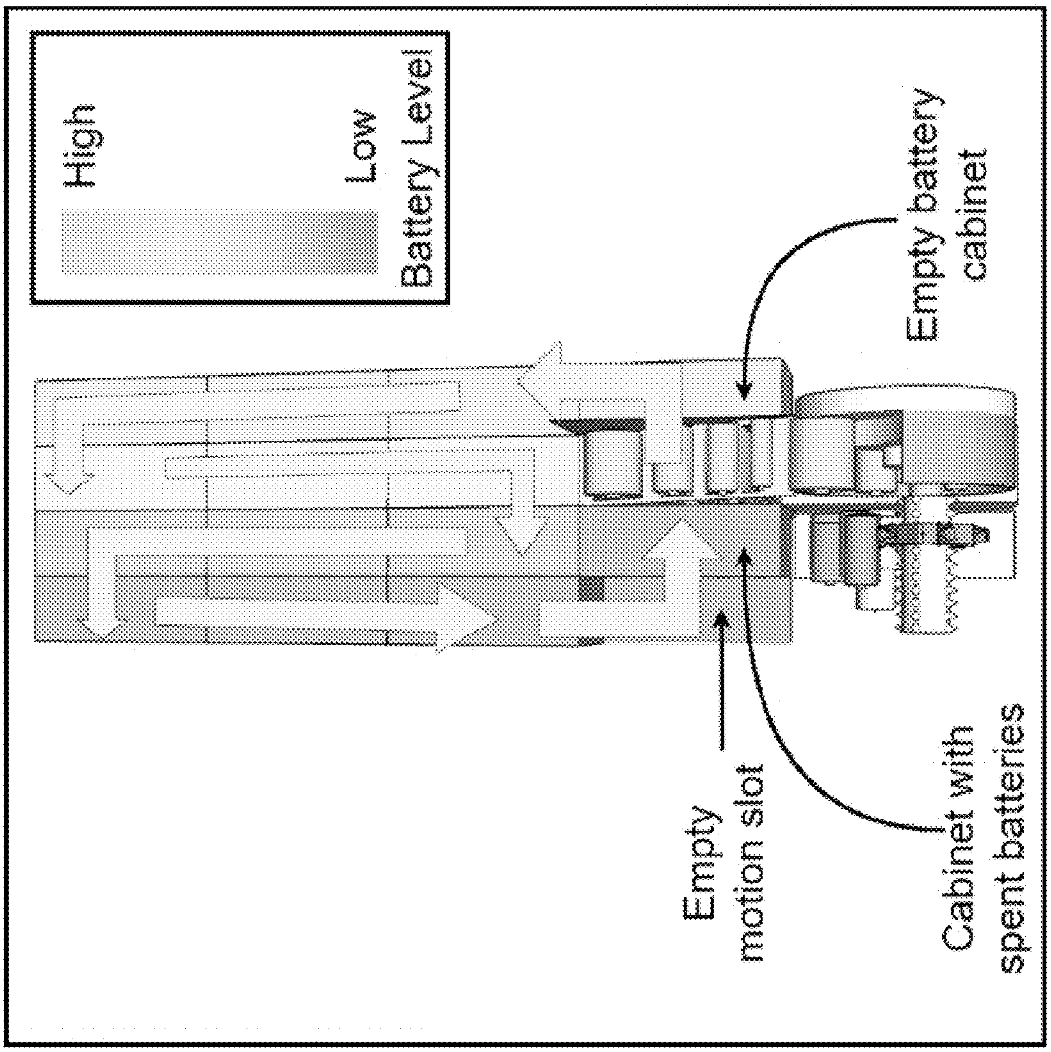

FIG. 8 provides an operational example of movement of the battery compartment slots of a BEV battery structure in accordance with some embodiments of the present invention.

Figure 9:
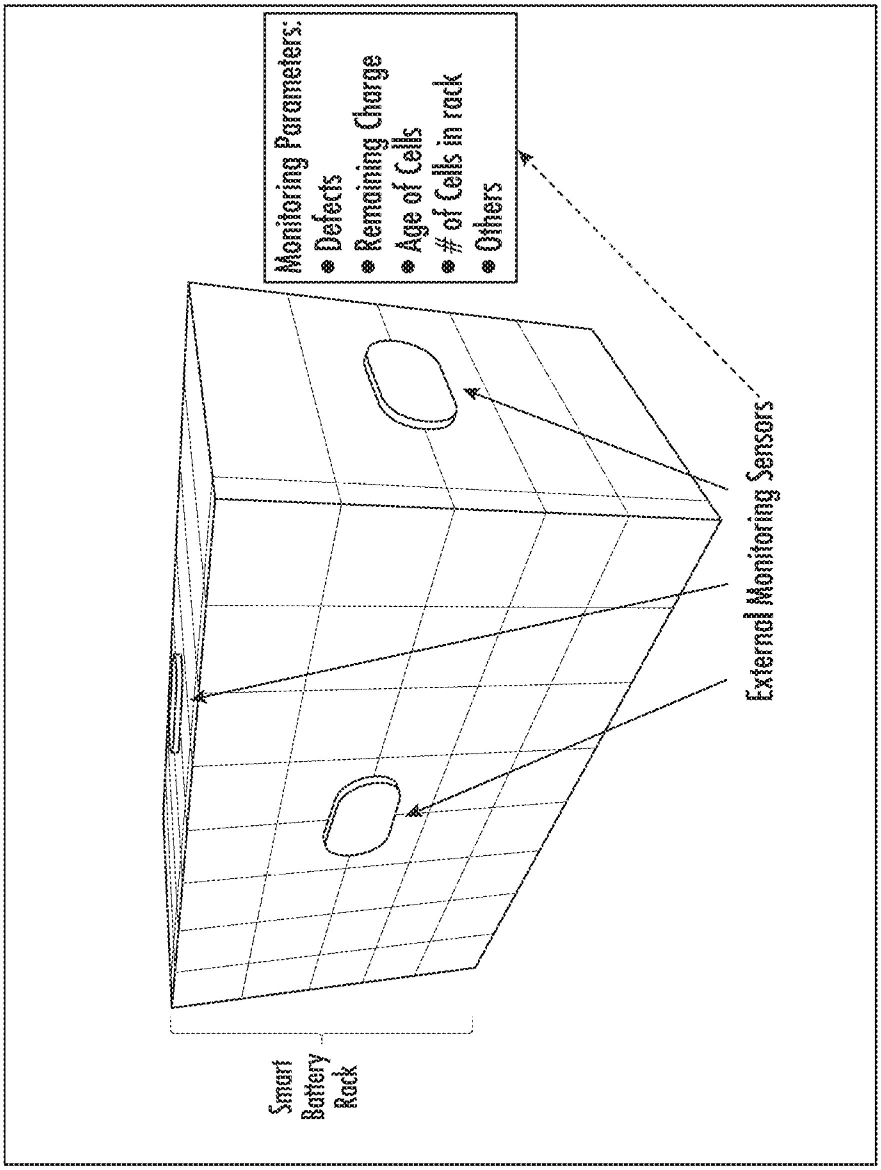

FIG. 9 provides an operational example of a smart battery rack system in accordance with some embodiments of the present invention.

Figure 10:
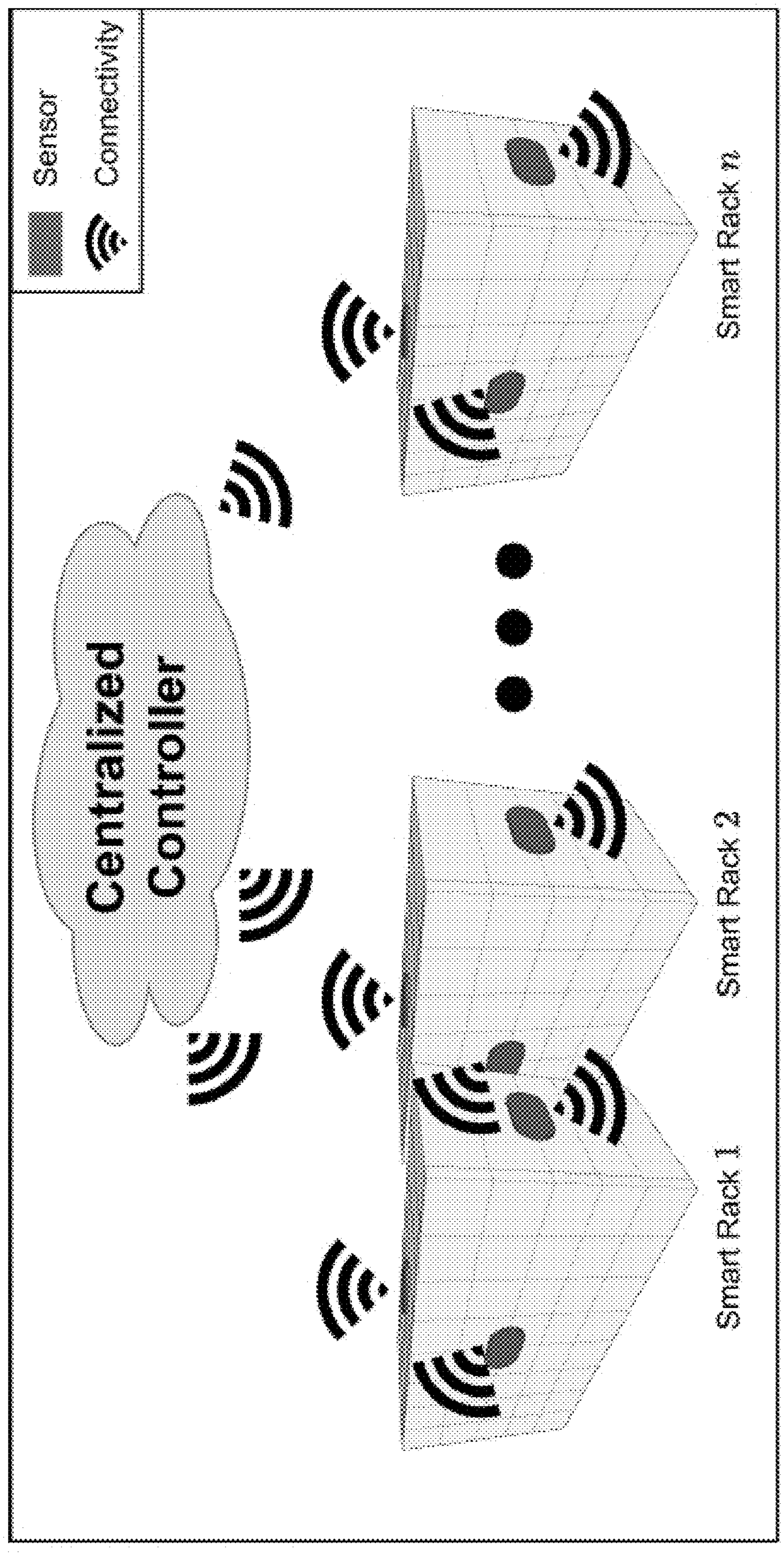
Figure 11:
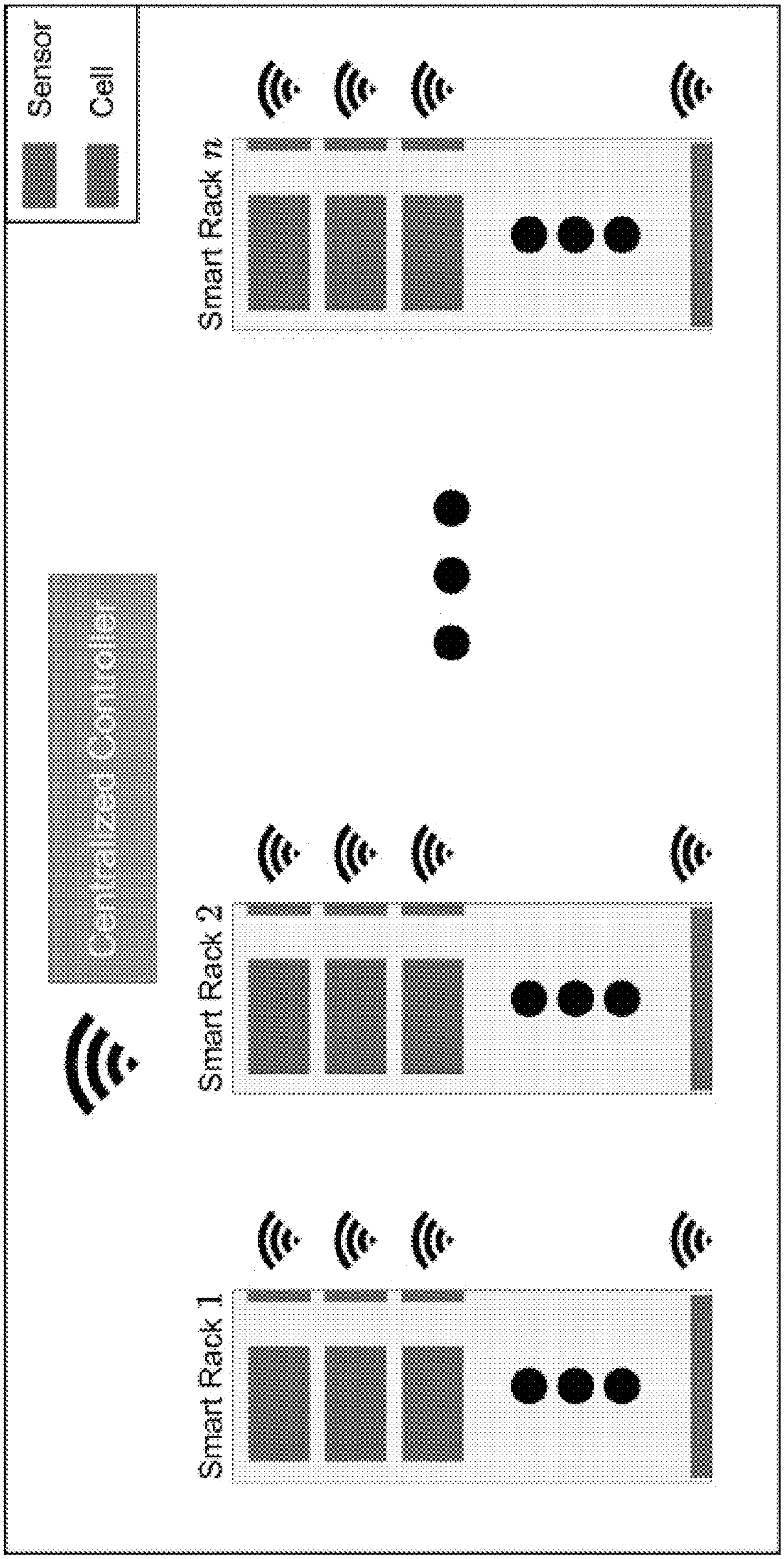

FIGS. 10-11 provide operational example of communications between different components of smart battery rack systems in accordance with some embodiments of the present invention.

Figure 12B:
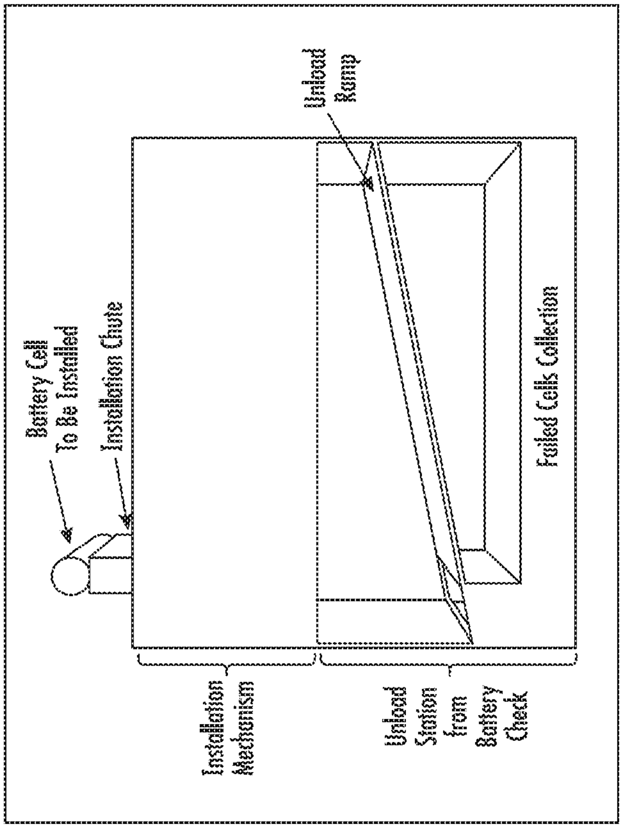
Figure 12A:
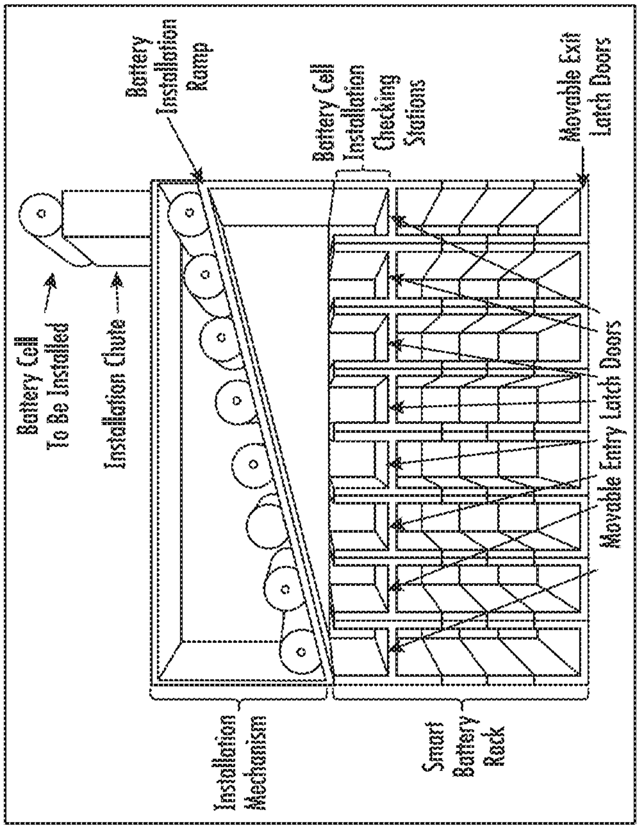

FIG. 12A provides an operational example of a process for installing a battery cell into a smart battery rack in accordance with some embodiments of the present invention.

FIG. 12B provides an operational example of a process for ejecting a battery cell from a smart battery rack in accordance with some embodiments of the present invention.

Figure 13:
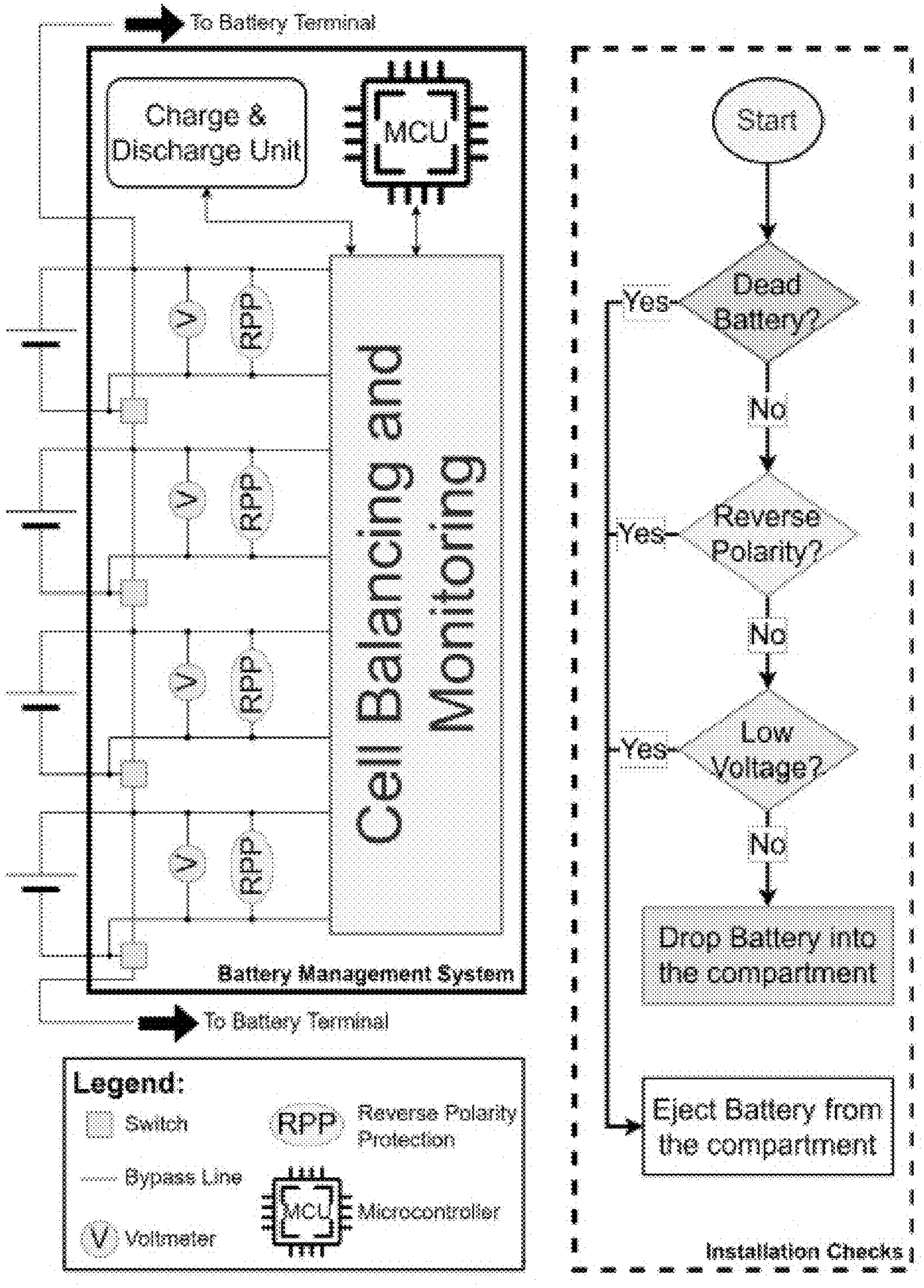

FIG. 13 provides an operational example of a process for performing operations of a modified battery management system in accordance with some embodiments of the present invention.

Figure 14:
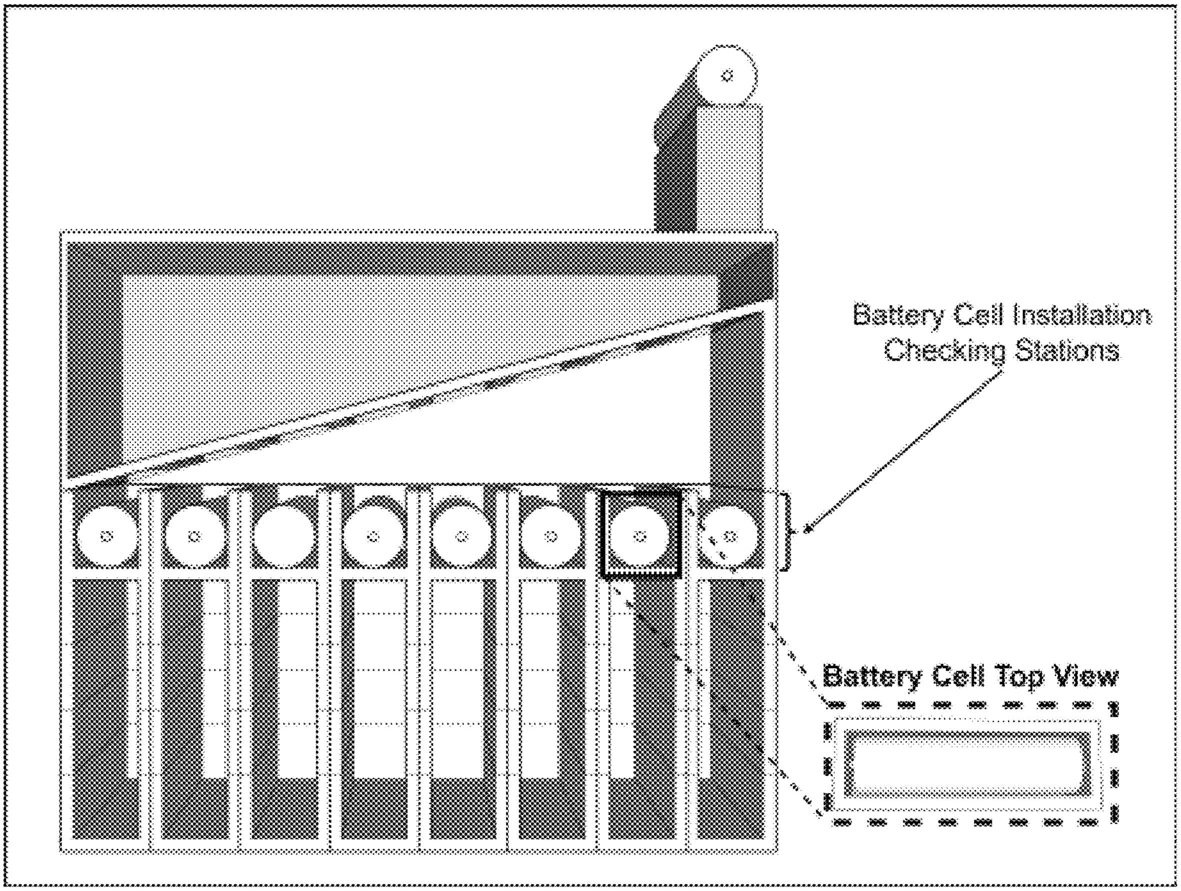

FIG. 14 provides an operational example of a state of a smart battery rack in which one row of battery cells are in battery cell installation checking stations in accordance with some embodiments of the present invention.

Figure 15:
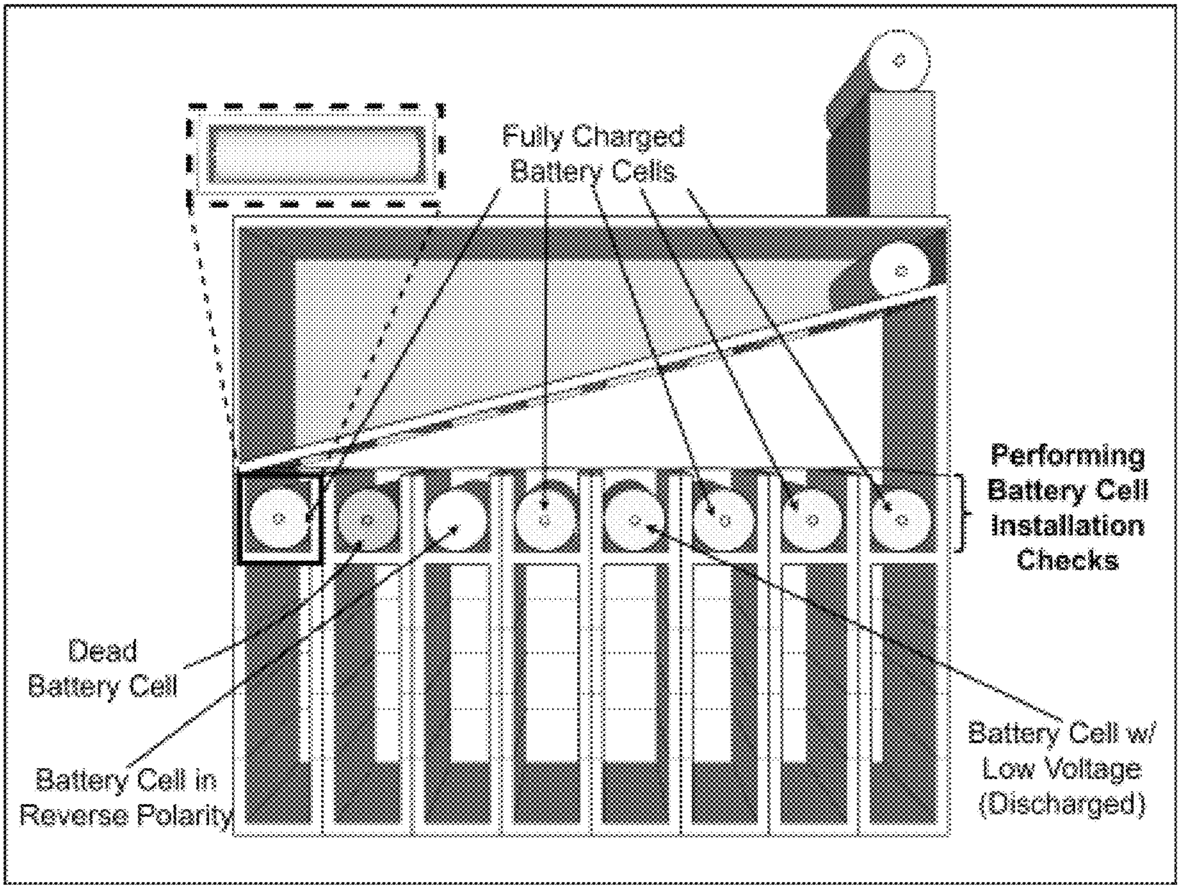

FIG. 15 provides an operational example of performing status check on battery cells in battery cell installation checking stations in accordance with some embodiments of the present invention.

Figure 16:
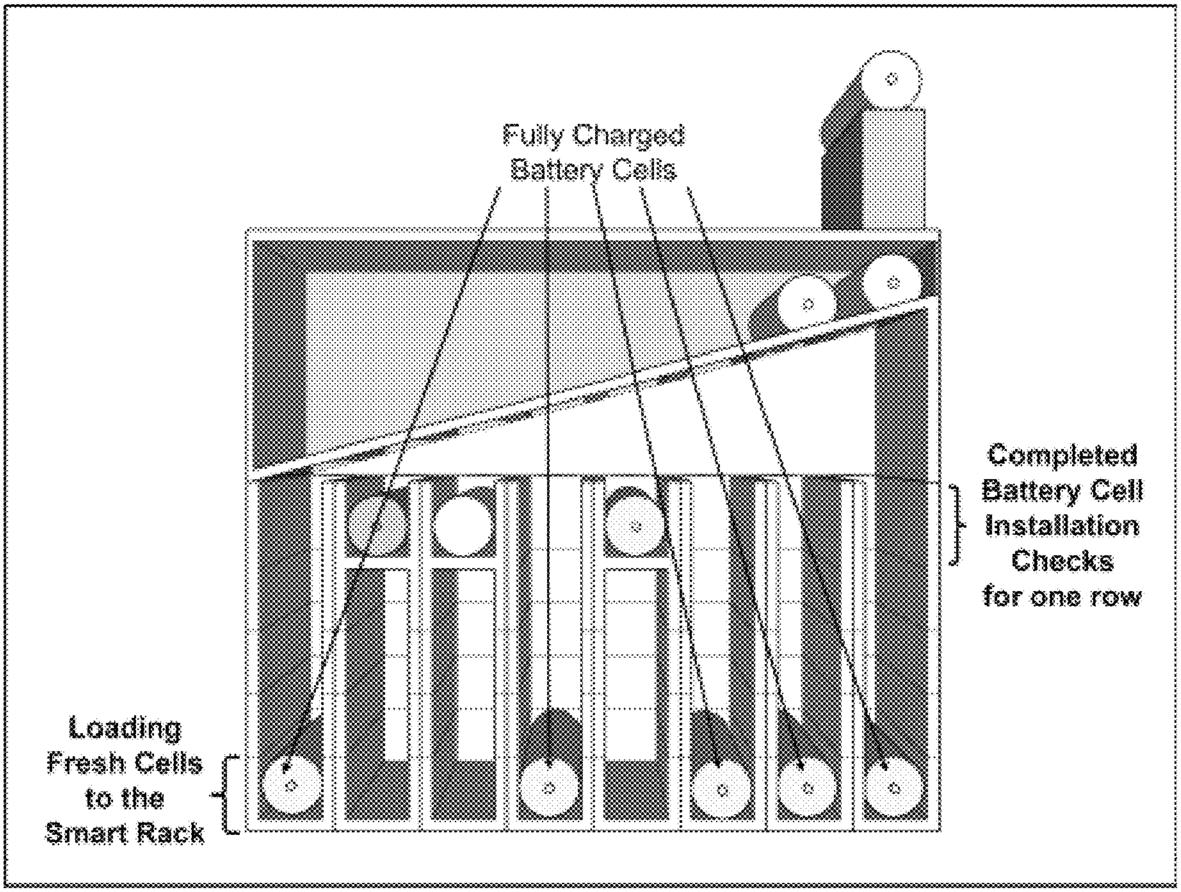

FIG. 16 provides an operational example of allowing battery cells that survive modified battery management system checks to enter into the smart battery rack in accordance with some embodiments of the present invention.

Figure 17A:
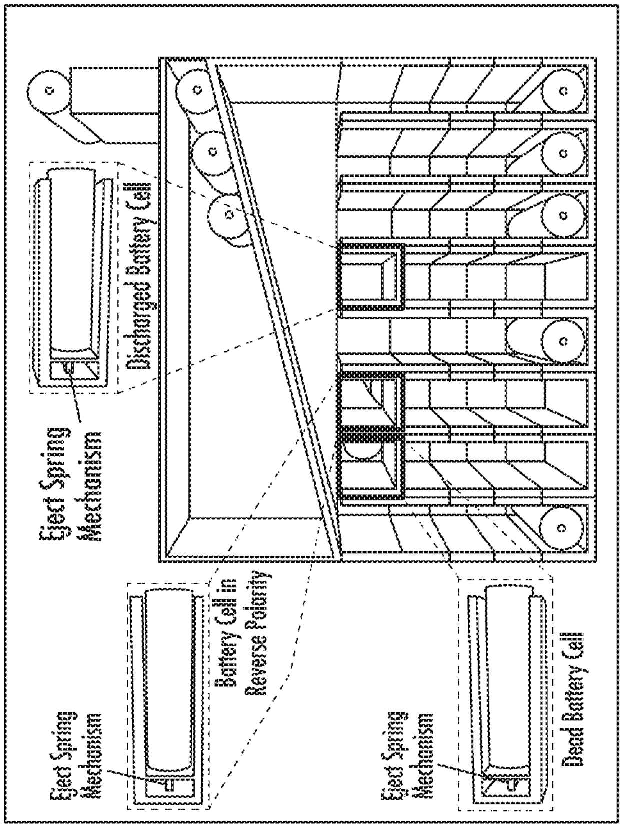
Figure 17B:
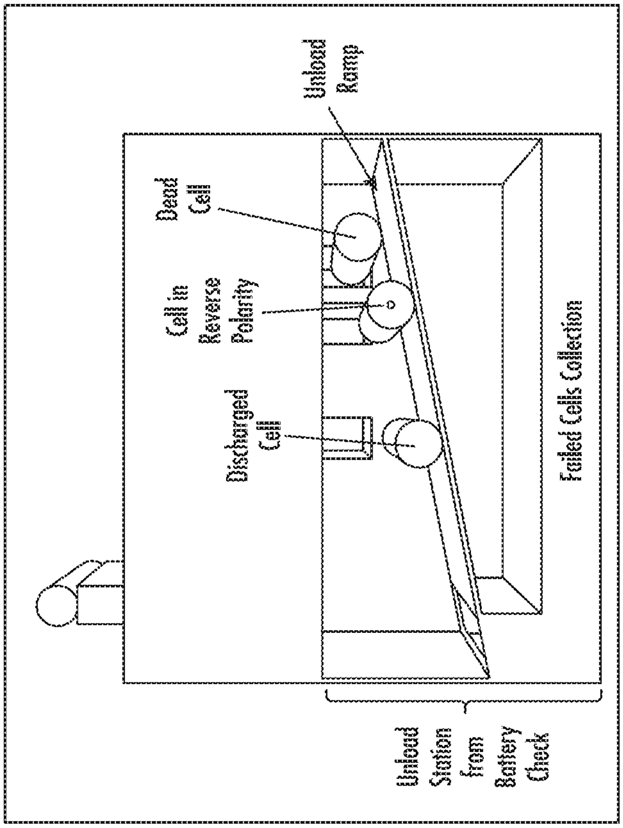

FIGS. 17A and 17B provide operational examples of battery cell ejection from a smart battery rack in accordance with some embodiments of the present invention.

Figure 18:
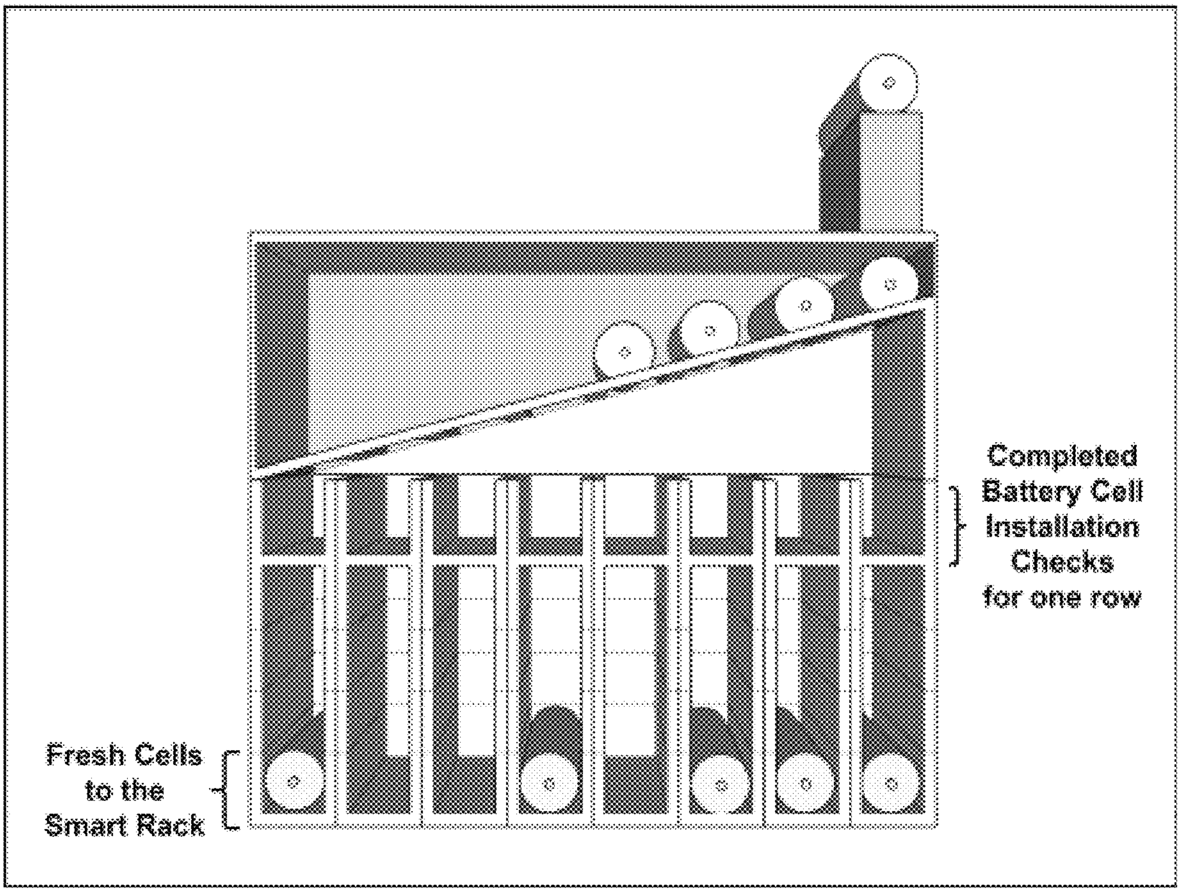

FIG. 18 provides an operational example of the state of a smart battery after performing entry checks for one row of battery cells in accordance with some embodiments of the present invention.

Figure 19:
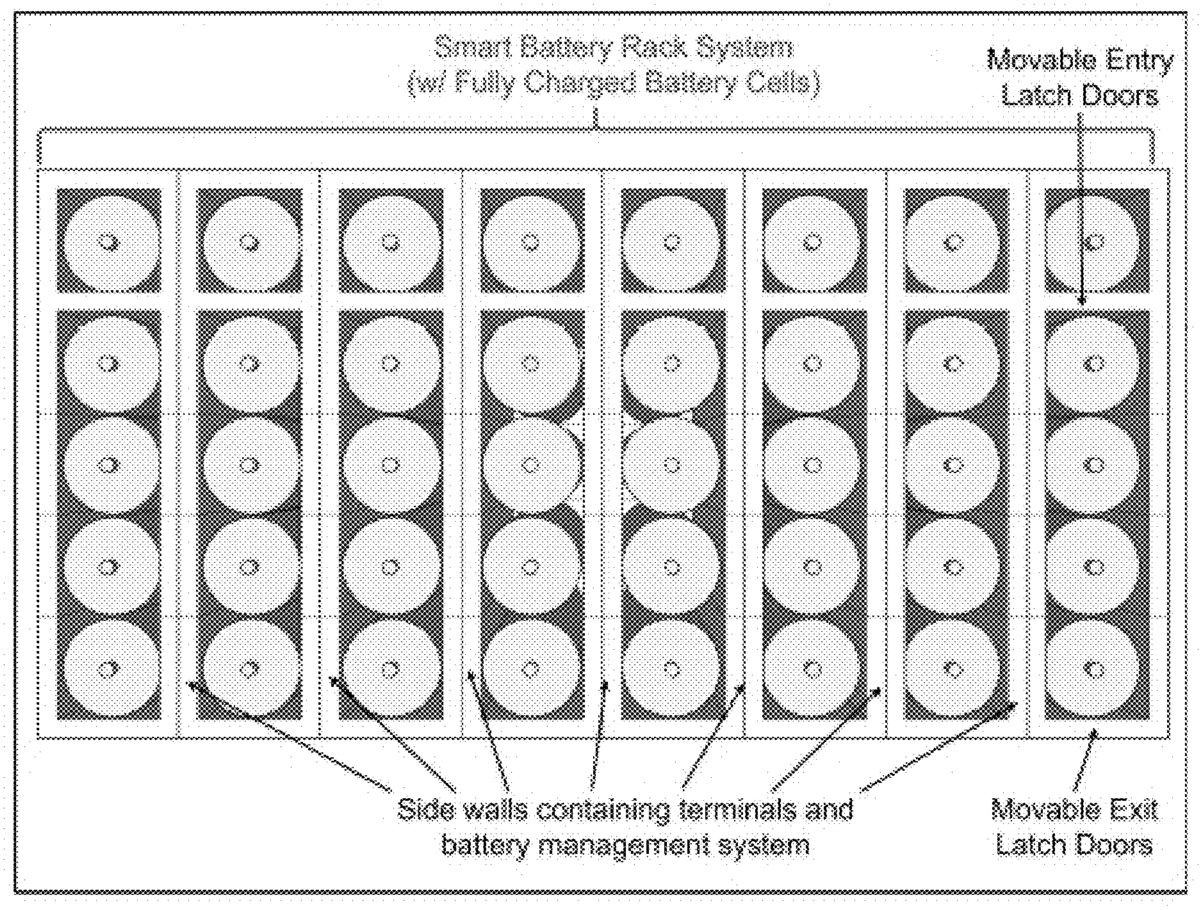

FIG. 19 provides an operational example of the state of a smart battery that is filled with fully charged battery cells in accordance with some embodiments of the present invention.

Figure 20:
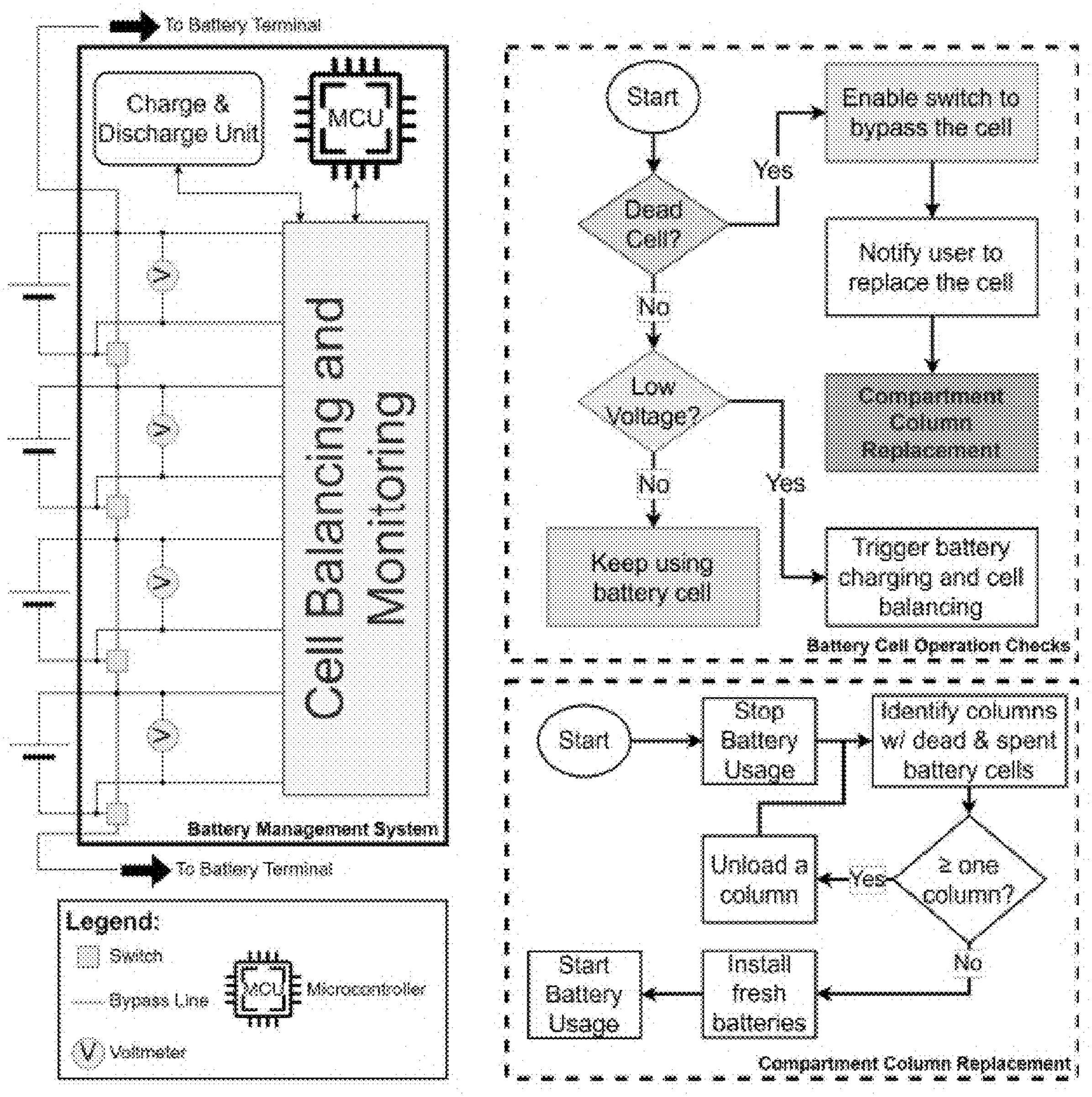

FIG. 20 provides an operational example of a compartment column replacement process in accordance with some embodiments of the present invention.

Figure 21:
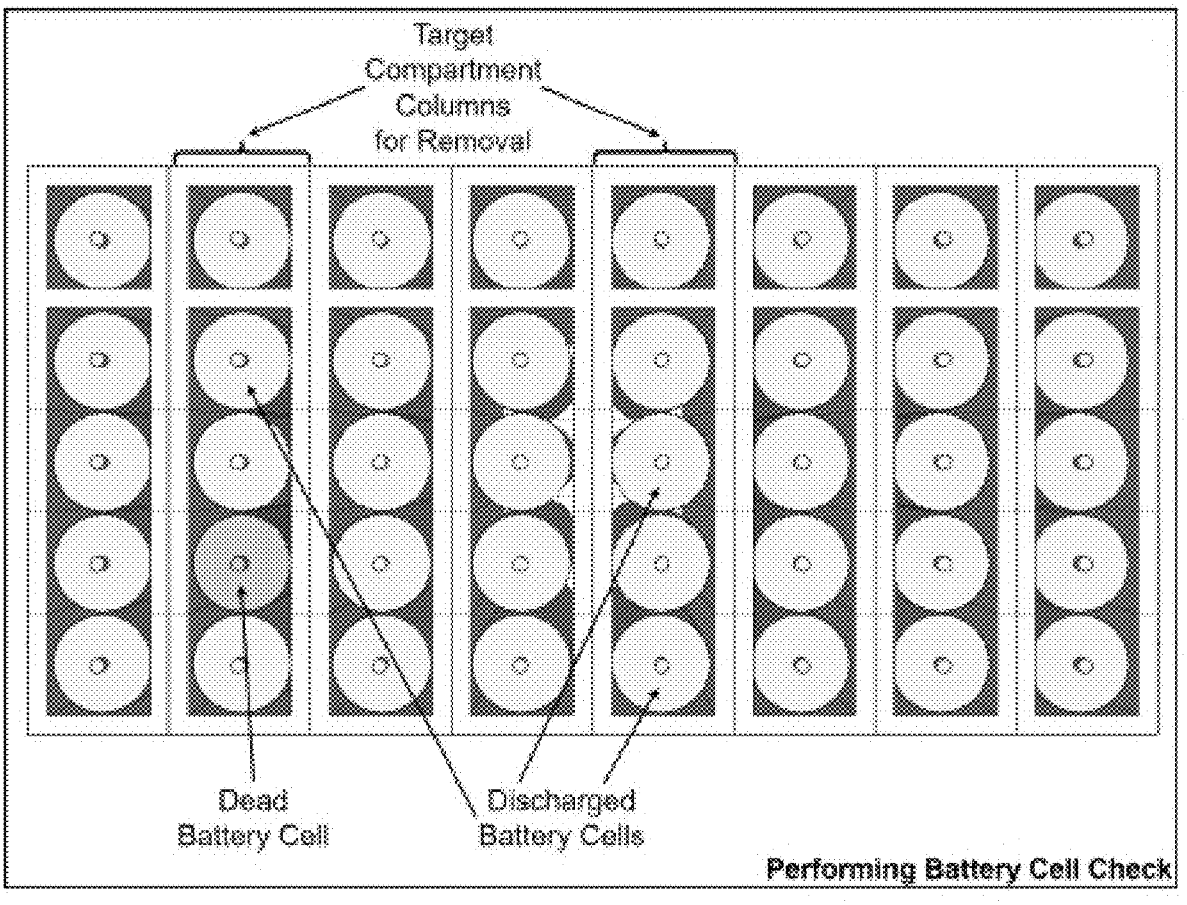

FIG. 21 provides an operational example of recording columns with dead/discharged battery cells during continuous monitoring of a smart battery rack in accordance with some embodiments of the present invention.

Figure 22A:
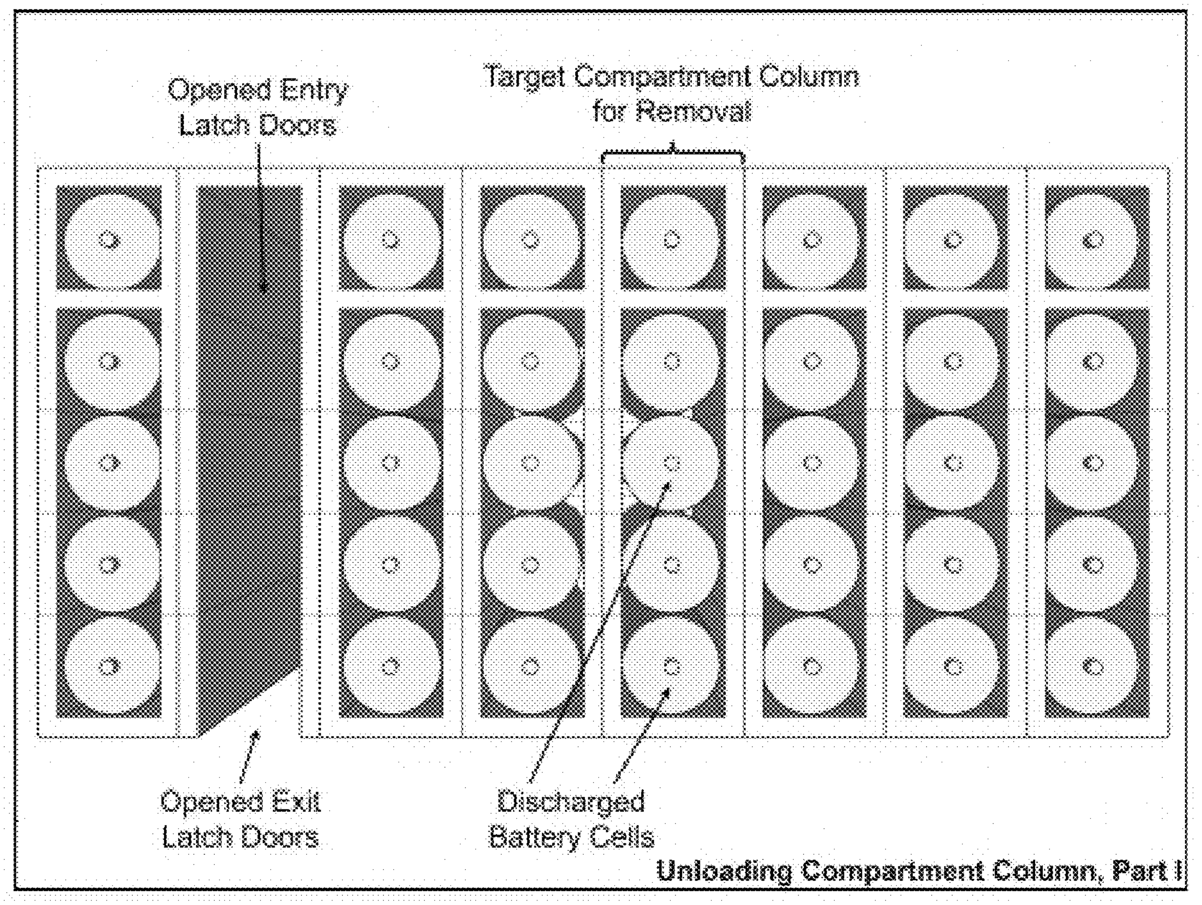
Figure 22B:
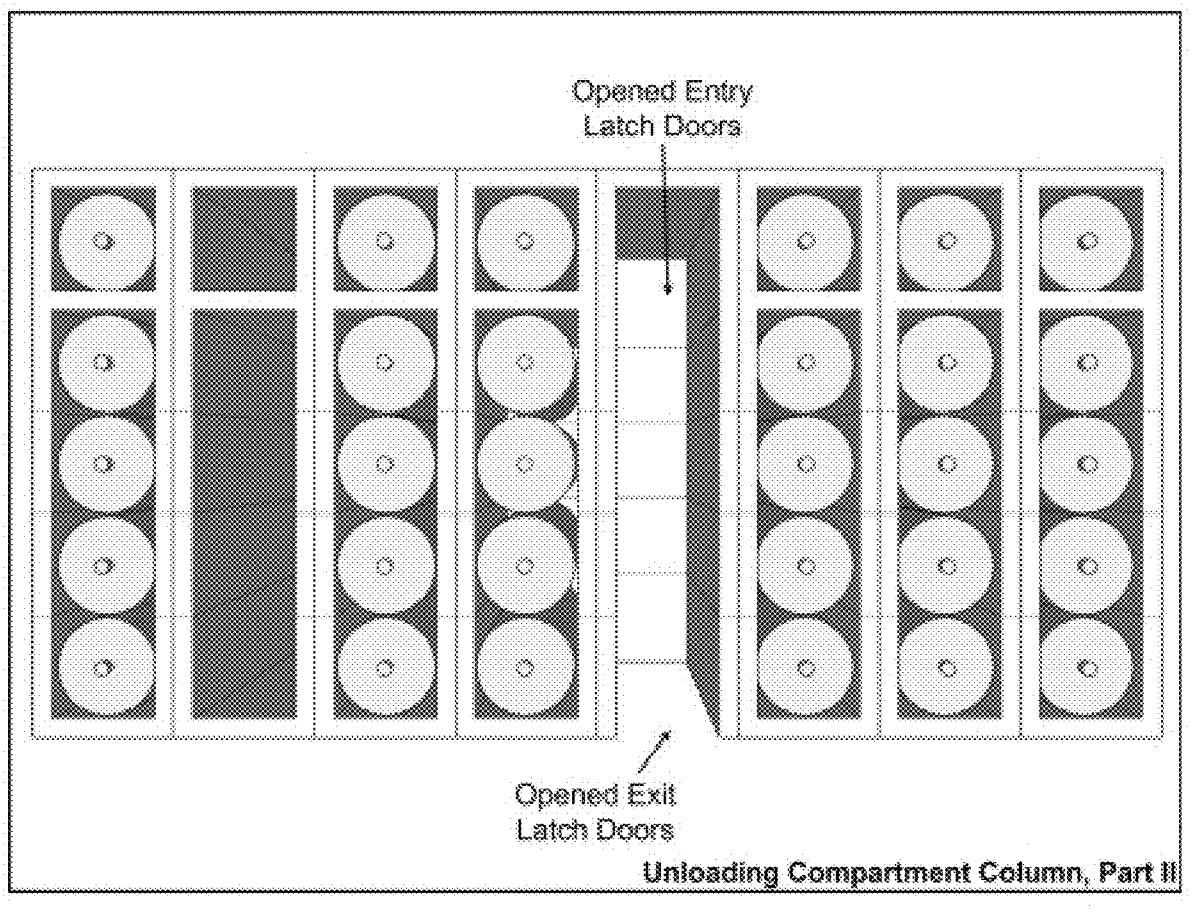
Figure 22C:
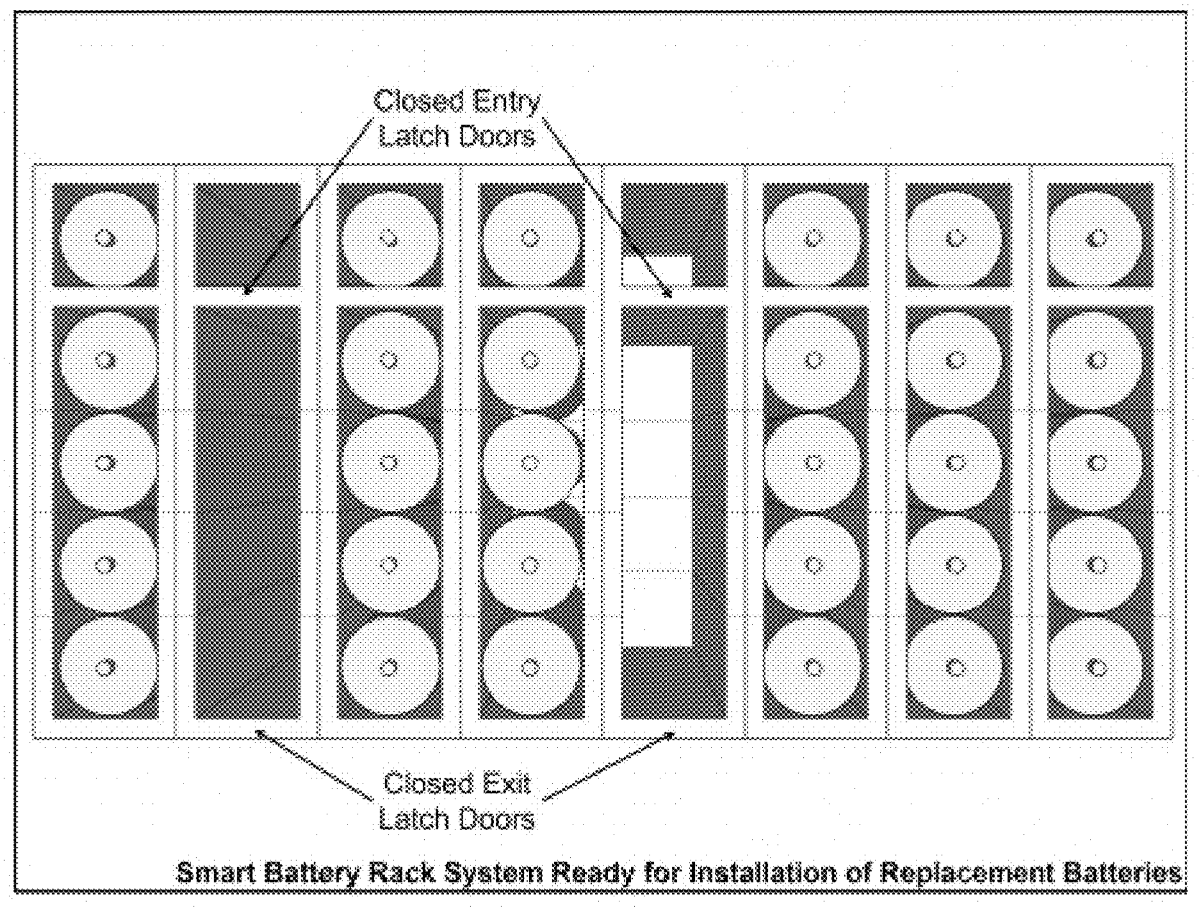

FIGS. 22A-22C provide an operational example of removing two columns with dead/discharged battery cells during continuous monitoring of a smart battery rack in accordance with some embodiments of the present invention.

Figure 23:
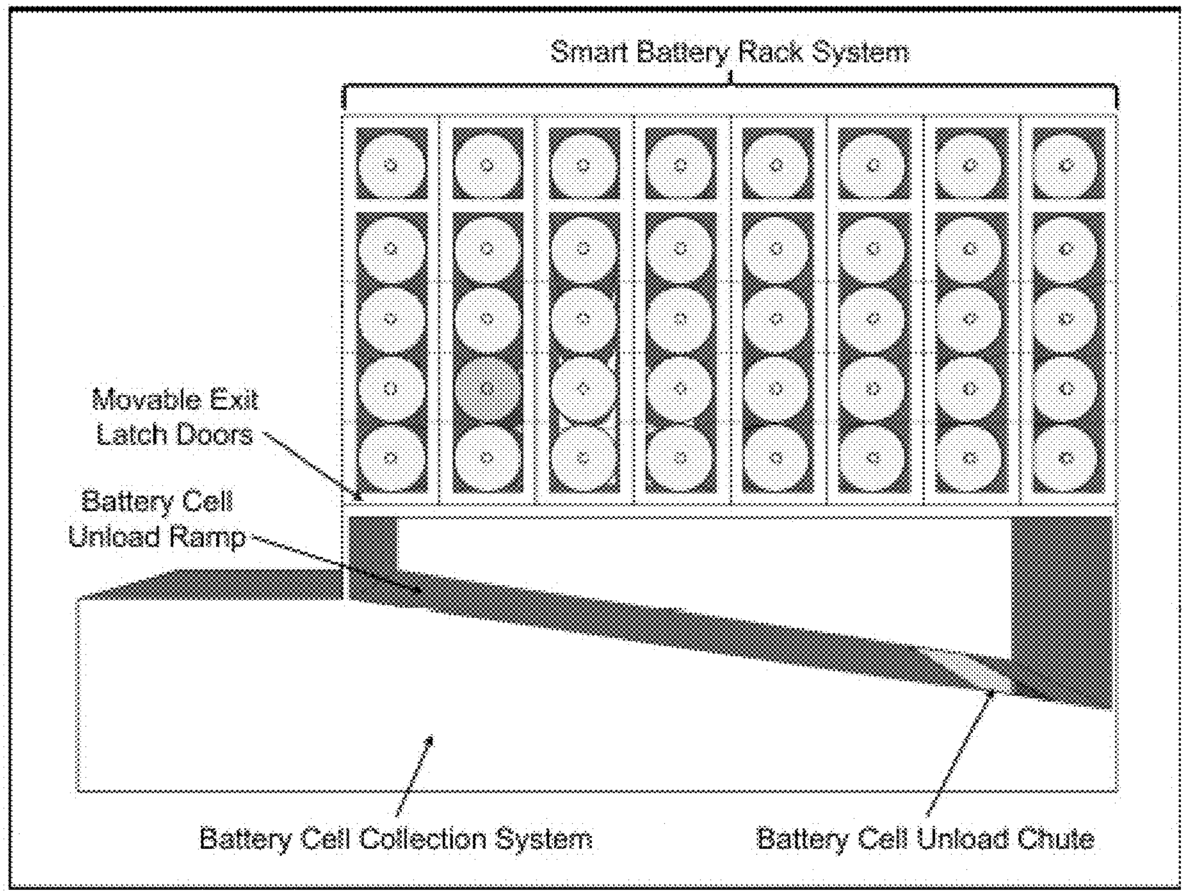

FIG. 23 provides an operational example of moving battery cells unloaded from a smart battery rack onto a battery cell collection system in accordance with some embodiments of the present invention.

Figure 24:
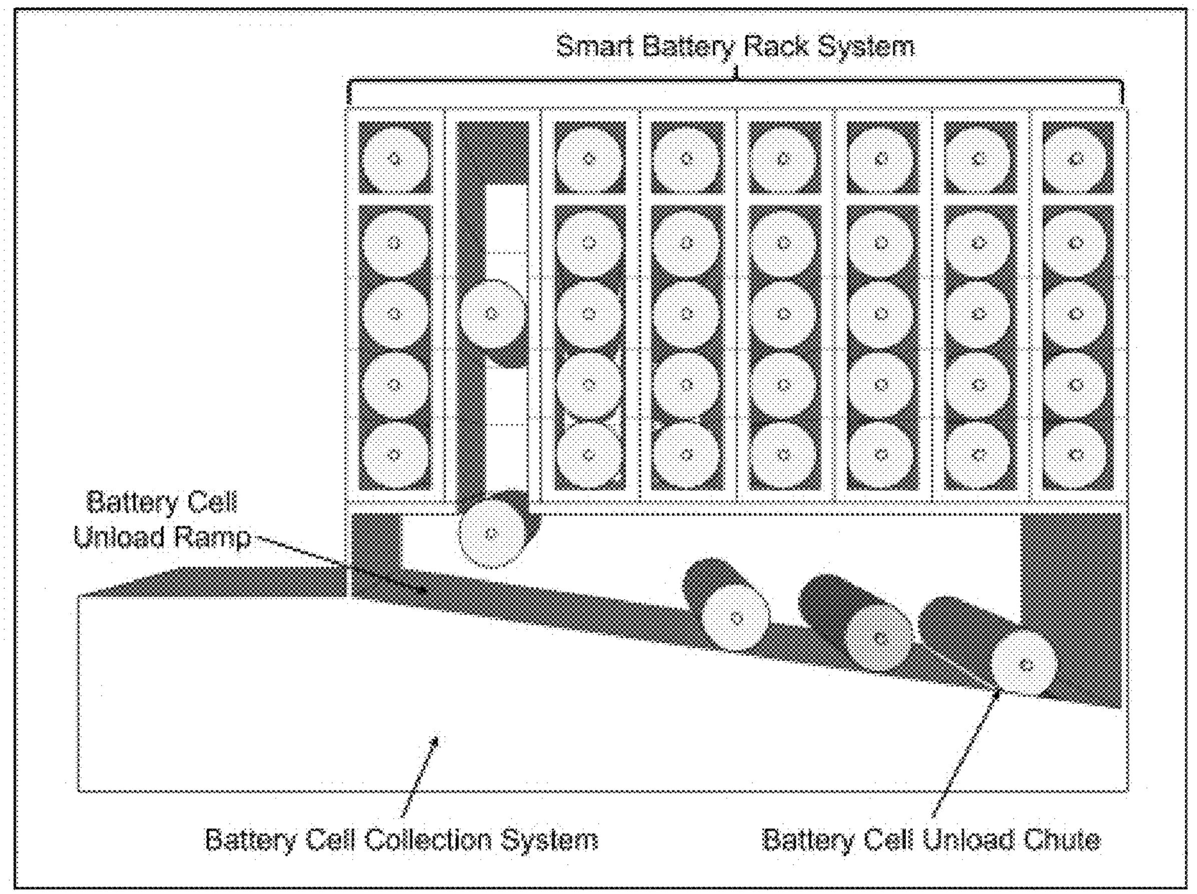
Figure 25:
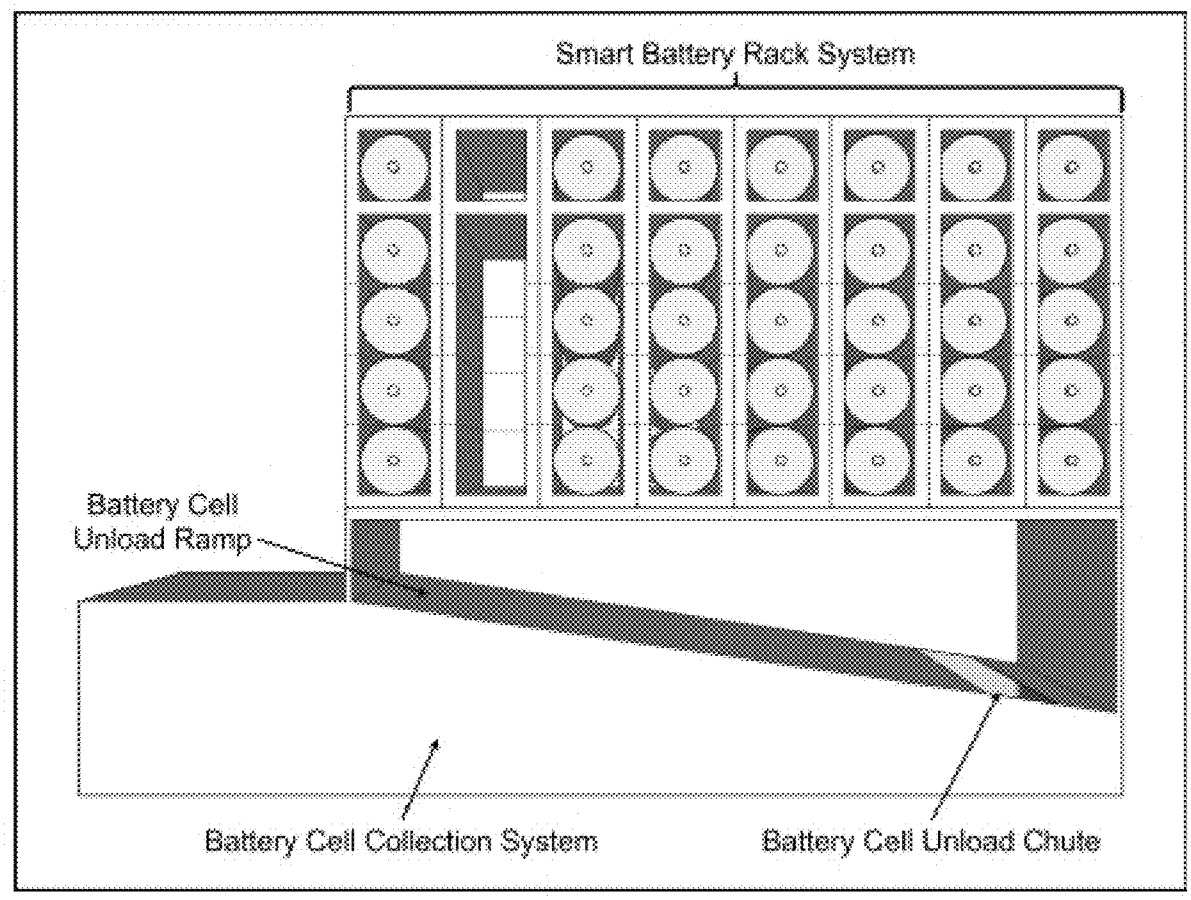

FIGS. 24-25 provides an operational example of unloading the battery cells a second column of a smart battery rack and closing the movable exit latch door for the second column in accordance with some embodiments of the present invention.

Figure 26:
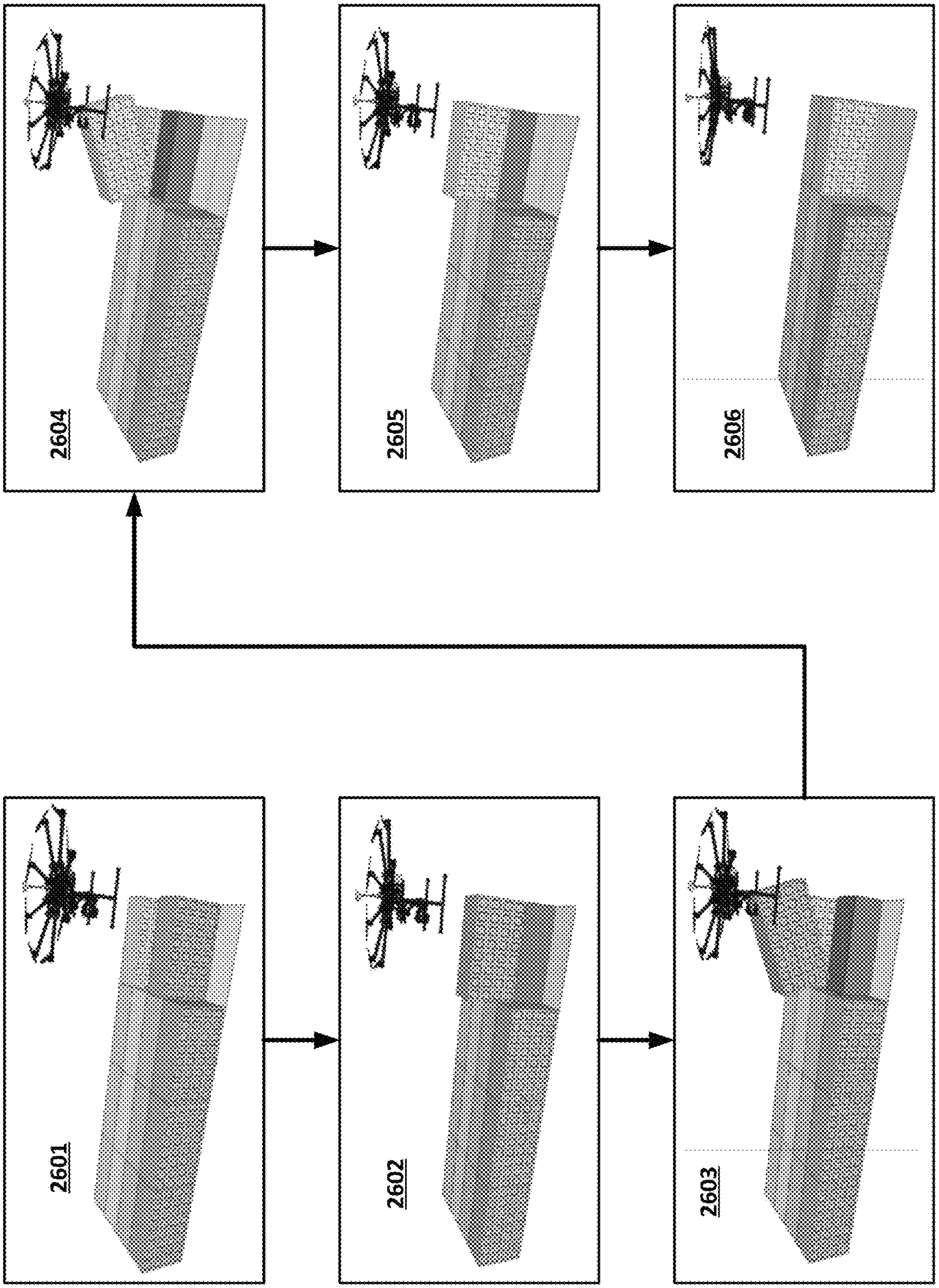

FIG. 26 provides an example process for battery cabinet replacement using a UAV in accordance with some embodiments of the present invention.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Alarming rise in greenhouse gas emissions, petroleum spillage, and environmental pollution can be greatly mitigated through the adoption of BEVs. However, there are several major technical challenges that deter a transition from ICE vehicles to BEVs. FIG. 1A provides various concerns expressed by vehicle consumers with respect to transitioning from an ICE vehicle to a BEV. As shown, these concerns include battery-related technical challenges, such as limited range, battery degradation, long charging time, lack of charging facility, and high purchase cost (due to high-capacity batteries).

Several solutions have been proposed to address these issues in BEVs, albeit with limited success and arriving with further technical challenges. For example, one proposed solution involves construction of solar roads; however, such solar roads are extremely expensive and experience sustained structural damage and lack of power generation efficiency. BEV-to-BEV stationary charging solutions may be theoretically useful in emergency situations, but such solutions are not scalable in the long run due to slow stationary charging and external dependencies on other vehicles. Existing efforts have been made to improve the inherent range of a battery, such as by increasing overall battery capacity, but success has been relatively limited, as shown in FIG. 1B (specifically showing battery range increment for the Tesla Model S). Further, enhanced-capacity batteries are typically larger, require longer to charge, make vehicles heavier (resulting in less powertrain efficiency), and increase greenhouse gas (GHG) emission during manufacturing. Another proposed solution involves mass construction of charging stations; however, feasibility of this solution is questionable due to high building costs, lack of real estate space, and failure to particularly address the inherent technical challenge in frequently halting to recharge a battery.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, "on-the-go" refers to activities that occur while terrestrial entities, aerial entities, aquatic entities, relay entities, charging entities, and other entities within the system that participate in or facilitate a charge transaction are in motion.

As used herein, the term "computing device" refers to a specialized, centralized device, network, or system, comprising at least a processor and a memory device including computer program code, and configured to provide guidance or direction related to the charge transactions carried out in one or more charging networks.

I. OVERVIEW AND TECHNICAL IMPROVEMENTS

Electric vehicles have existed for a while but have never enjoyed mainstream adoption. Now, with a global desire to reduce the carbon footprint of transportation systems and many leading auto manufacturers entering the electric vehicle (EV) space, EVs have become more appealing and affordable. Nevertheless, the adoption of EVs remains slow, mainly due to consumer concerns regarding battery life, battery range, and limited access to charging stations. Current methods for charging a battery for a battery-powered entity (e.g., vehicle, drone, vessel, robotic system, etc.) typically require that the battery-powered vehicle be parked in a fixed location during charging, and the user of the battery-powered entity must typically initiate charging of the battery-powered entity manually. This typically requires a great deal of time for charging and reflects a large inconvenience to the user of the battery-powered entity. As a further example of current hurdles to large-scale implementation, there are currently a limited number of charging ports at fixed charging locations for battery-powered entities, meaning that use of the charging ports typically operates on a first come, first serve basis. In other words, a first battery-powered entities having a battery at 90% charge capacity might be connected by the user for any reason before a user of a second battery-powered entities having a battery at 20% charge capacity without any priority given to the battery-powered entities having a lower charge capacity. Thus, there is currently no way to determine at a system level which battery-powered entities should be charged and at which charging location. Therefore, there is a long-felt need in the industry for a system, method, and apparatus for charging battery-powered entities without relying on stationary charging solutions.

As such, according to the current systems and approaches for charging EVs, EVs have a range that is limited by battery capacity and charge density, among other factors, which can restrict the effectiveness and suitability of EVs for long-distance driving. Even with enough charging stations, the charging stations are properly located along a driver's intended route, and rapid charging is used at every charging station along a driver's intended route, the travel time is impacted due to frequent, long halts for charging. Further, while the driver's intended route may have sufficient number of charging stations, all perfectly distributed and located along the driver's intended route, the driver is still forced to maintain their intended route and may not deviate unless they previously plan their deviation from the intended route to ensure there are sufficient charging stations located along the new route which deviates from the intended route.

Also, most of the modern high-end EVs are using Lithium-ion batteries, for which complete discharging and charging, or inefficient charging cycles can cause the Lithium-ion batteries to age at an accelerated rate. Hence, a long-distance drive without recharging the battery is undesirable for EVs. While improving the battery capacity is undoubtedly helpful, it could significantly increase the price of the EV. Besides, increasing battery capacity also may not solve the core problem of having to stop at a designated station to recharge.

As research continues to progress with regard to lithium-ion batteries that have a higher charge capacity or charge density, among other characteristics, the price per kilowatt-hour (kWh) for lithium-ion batteries is being reduced, but at a comparatively slow rate, making it difficult to increase the battery capacity of EVs without a drastic price increase. In addition, even drastically increasing the battery capacity of EVs will likely only solve some of the problem and may well only be possible for very high-end EVs due to the elevated cost of such advanced battery technologies. Even high-end EVs may have a maximum range of 300 to 370 miles but suffer from high charging times. Even with a 220V charging station, it often takes about 10 hours for a full charge. Although 440V stations may reduce the charging time, the amount of charging stations expected to be required to support a large EV fleet would be enormous and costly.

Currently, there are only limited stationary charging stations, even in urban areas of the wealthiest countries in the World. The overall number of stationary charging stations are few compared to refueling stations for vehicles with internal combustion engines (ICEs) and mostly limited to urban areas. EVs, especially high-end EVs, will suffer long charging times are level-1 or level-2 charging stations.

A brute force solution to the battery range and charging problem could be to build a high concentration of very high speed (Level-3) charging stations to allow fast charging anywhere in the World. However, dense and uniformly placed Level-3 stations costing $100,000 each is not feasible. Furthermore, the local power grids must be able to handle the large amount of power that must be transferred in a short amount of time for these stations. Also, there are currently very few level-3 stations (a.k.a. DC Fast Charging [DCFC] stations), making it infeasible to sustain a big EV fleet. Furthermore, building a large number of DCFC stations to sustain a big EV fleet is financially infeasible as each charging unit costs between about $10,000 U.S. Dollars (USD) and about $40,000 USD. Even if such DCFC stations could be built and distributed across a geography, there will still be many instances in which a higher density of EV drivers are clustered around a limited supply of DCFC units at one or more local DCFC stations while other DCFC stations in other areas go relatively unused. The immobility of the fixed location charging system, coupled with the unpredictable and dynamic nature of EV traffic patterns in EV charging systems makes it impossible to quickly adjust charging supply to changes in charging demand.

Another possible solution is to charge vehicles on the fly directly from the roadway. However, in initial implementations in France and elsewhere, roadways fitted with solar panels and designed to charge vehicles on the fly were only able to produce about 80,000 kWh per year due at least in part to the inherent dependency on suitable weather. Converting every road in the world into an electric/solar road is a big financial undertaking, rendering the solution infeasible. Likewise, roadways for on-the-fly EV charging that are powered by the grid are inefficient as every portion of the roadway must be powered by costly and environmentally impacting grid electricity, which is dependent upon the regional or local grid mixture and the inherent environmental impacts and costs associated therewith.

As such, provided herein are apparatuses, systems, computer program products, and methods that relate to an innovative framework for replenishing BEV batteries on-the-go with the help of unmanned aerial vehicles (UAVs) and mobile charging stations (MoCS). That is, various embodiments include a mobile multi-modality recharging framework including vehicles and apparatuses configured to provide and/or receive mobile multi-modality recharging, methods for performing and/or configuring mobile multi-modality recharging, computer program products for performing operations for mobile multi-modality recharging, and/or the like. Further, various embodiments described herein provide battery replacement systems and battery storage systems that may be implemented by a BEV or a vehicle receiving mobile multi-modality recharging.

Accordingly, various embodiments enable rapid BEV battery replenishment to thereby eliminate the need for BEVs to make prolonged and pre-planned halts for recharging. As a result, various embodiments provide expanded capabilities and other technical improvements across many transportation and vehicular applications. For example, in package delivery applications, package delivery UAVs can utilize various embodiments described herein to make long-distance trips with the help of mobile charging stations and BEVs. The present disclosure includes a quantitative and simulated analysis of the effectiveness of an example mobile multi-modality recharging framework in accordance with various embodiments described herein, with the analysis demonstrating various resulting technical benefits. Through further statistical analysis, the present disclosure also shows that greenhouse gas emission (even for BEVs and UAVs) can be significantly reduced by various embodiments described herein that power MoCSs via renewable energy sources (e.g., solar).

Table 1 describes properties of a set of proposed solutions for the battery-related technical challenges associated with use of BEVs, including the cost of each proposed solution, the deployability of each solution, the mobility of each solution, whether each solution involves the use of mobile charging stations (MoCSs), and whether each solution involves the use of unmanned aerial vehicles (UAVs). As depicted in Table 1, the set of proposed solutions include the following existing approaches: building more BEV charging stations, increasing battery capacity, charging from the road, BEV-to-BEV using a charging hub, road-side BEV-to-BEV charging, and peer-to-peer car charging (P2C2). As depicted in Table 1, the set of proposed solutions further include a sustainable autonomous vehicle network (SAVIOR) approach that is proposed by various embodiments of the present invention.

TABLE 1

| Solution | Cost | Deployability | Mobility | Mobile Charging Stations | Drone Support |
|---|---|---|---|---|---|
| More BEV Charging Stations | Very High | Hard | Stationary | No | No |
| Higher Battery Capacity | Very High | Moderate | — | No | No |
| Charging from Road | Very High | Hard | In-Motion | No | No |
| BEV-to-BEV (Hub) | High | Moderate | Stationary | No | No |
| BEV-to-BEV (Roadside) | Moderate | Easy | Stationary | No | No |
| P2C2 | Moderate | Moderate | In-Motion | Yes | No |
| SAVIOR | Moderate | Moderate | In-Motion | Yes | Yes |

As depicted in Table 1, one major flaw is shared among most of the existing solutions: vehicles need to remain stationary while charging and endure a long waiting time. In addition, individual existing approaches each suffer from a range of challenges. For example, building more charging stations is expensive and does not help reduce the vehicle's stationary time during charging. As another example, high-speed charging loses efficiency after the battery charge level crosses a certain threshold. A significant research effort is also being put towards developing higher capacity batteries. However, the range of BEVs is not increasing fast enough to convert avid ICE vehicle users any time soon. Moreover, a larger battery will generally mean longer charging/waiting time, increased BEV cost and more GHG emission from battery production. As another example, the BEV-to-BEV charging hubs are generally expensive to build and to avoid such construction efforts, direct BEV-to-BEV stationary charge sharing frameworks were proposed. However, both the receiver BEV and the donor BEV are expected to remain stationary during the charge transaction. Stationary charging leads to travel time loss, expensive parking requirements, and hinders any effort towards building an autonomous shared BEV fleet in perpetual motion (i.e. reducing the effectiveness of level-5 autonomous BEVs). Moreover, as depicted in Table, none of the existing approaches involves using UAVs.

Various embodiments described herein have been developed to include solutions to two major overarching challenges: (1) stationary charging is not effective unless a massive battery can be charged in a few minutes, and (2) charging from the road is typically expensive, potentially hazardous, and may not be effective in diverse geographical regions. In addressing these major technical challenges, various embodiments described herein provide a sustainable autonomous vehicle network (which may be referred to interchangeably as SAVIOR), or a framework within which networks of BEVs and unmanned aerial vehicles (UAVs) cooperate to dynamically address each other's mobility issues. That is, various embodiments provide technical benefits and improvements in for BEVs as well as UAVs. UAVs themselves may be considered as BEVs, as example UAVs may operate on battery power and therefore suffer from the same associated battery-related problems. FIG. 1C indicates further challenges more related to UAVs specifically, such as environmental (e.g., wind) susceptibility and low power efficiency at high speed, and these challenges may be addressed by example embodiments described herein.

In particular, according to an example framework, BEV batteries are replenished on-the-go with the aid of UAVs and mobile charging stations (MoCSs). Meanwhile, in the example framework, UAVs are guided to recharge from BEVs and/or MoCSs and/or may attach themselves with BEVs that are travelling in the same general direction (thus addressing the UAV-related challenges shown in FIG. 1C). Hence, surface-based BEVs and air-based UAVs may cooperate within the example framework in symbiotic relationships for improved overall system efficiency, and in various embodiments, cooperative communication is provided through one or more cloud networks. Various embodiments specifically include techniques for on-the-go BEV battery replenishment (e.g., replacement) using UAVs and algorithms for scheduling MoCS placement and for BEV-to-BEV and UAV-to-BEV pairing for mutual support. The present disclosure describes an evaluation platform for the example framework and provides benchmark results for different system parameters generated through the evaluation platform.

Accordingly, various embodiments of the present disclosure make significant and specific technical contributions to the field. First, major battery-related mobility limitations in BEV and UAV networks are identified, and a framework is developed to address the identified limitations. The framework includes efficient algorithms for on-the-go cooperative charging of BEV batteries with the aid of UAVs and/or MoCSs, as well as for charging of UAVs by BEVs and/or MoCSs. Next, a simulation-based evaluation platform with highly tunable parameters is designed and used for benchmarking various embodiments described herein. In some example embodiments, the simulation-based evaluation platform is built upon the widely accepted open-source SUMO simulator. In a further contribution, various embodiments described herein are extensively evaluated with respect to both quantitative effectiveness and qualitative effectiveness using the evaluation platform along with statistical analysis. The present disclosure demonstrates the potential of various embodiments in drastically improving mobility as well as reducing GHG emissions.

II. EXEMPLARY RECHARGING FRAMEWORK AND ARCHITECTURE

FIG. 2 provides an operational example of major components of a SAVIOR framework that may be implemented in accordance with various embodiments of the present invention. As depicted in the left-most depiction of FIG. 2, the SAVIOR framework includes a UAV network comprising a set of UAVs, a BEV network comprising a set of BEVs and a set of MOCSs. The noted components interact using a cloud-based control system directing individual BEVs, UAVs and MoCSs for charge sharing. The SAVOR framework of FIG. 2 enables a symbiotic relationship between UAVs and BEVs which involves supporting each other for long-distance travel. One aspect of this symbiotic relationship is depicted in the middle depiction of FIG. 2, which depicts that, when a BEV is low in charge, a nearby MoCS can use a battery-delivering UAV to replace spent batteries of the BEV with fresh batteries. Another aspect of the symbiotic relationship between the components of the SAVIOR system is depicted in the right-most depiction of FIG. 2, which depicts that, when a package-delivering UAV is making a trip that is deemed sufficiently long distance, the package-delivering UAV can latch onto a moving BEV that, among other requirements, is travelling in the same general direction as the package-delivering UAV. The moving BEV that enables the latched package-delivering UAV to have increased mobility and/or to recharge during the period in which the package-delivering UAV latches onto the moving BEV.

As depicted in the middle portion of FIG. 2, UAVs may interact with moving BEVs to replace spent batteries of the BEVs with fresh batteries. In some embodiments, such an interaction may be performed in accordance with the operational example that is depicted in FIG. 3. As depicted in the second left-most depiction of FIG. 3 (as well as in FIG. 8), the battery structure of a BEV (which, as depicted in the left-most depiction of FIG. 3, may be placed at the bottom of the BEV to ensure a low center of gravity) includes a set of battery cabinets, where each battery cabinet is generated by assembling a set of battery cells (e.g., a set of lithium-ion battery cells) via three-dimensional stacking. The battery structure may also be associated with movable mounts that enable conveying the battery cabinets in circular motion depending on their charge level and by using the empty slot 301 to enable movement of the battery cabinets. The movement causes discharged battery cabinets (i.e., battery cabinets with battery cells that are ready for removal) to be moved to an extraction slot (i.e., the slot that is immediately to the right of the empty slot 301) that may be proximate to the BEV's trunk. Accordingly, as depicted in the right-most depiction of FIG. 3, the battery-delivering UAV can land on the BEV's trunk and extract battery cells of a discharged battery cabinet in the extractions lot via an access point that is an opening in the trunk which is linked to the extraction slot using a teethed conveyor belt. After removal of the battery cells of the discharged battery cabinet by the UAV, the battery cabinet that included the removed battery cells, which is now an empty battery cabinet, is shifted to the right, which can now receive new battery cells provided by the same UAV or by another UAV. The noted UAV may fill up the empty cabinet with fully charged battery cells (as depicted in the second right-most depiction of FIG. 3). This may be performed through a separate opening at the BEV's trunk. This entire process may be accomplished through a set of protocols autonomously executed by the BEV, MoCS, battery cabinets and the UAVs. Sensors and actuators inside the battery cabinets communicate with the UAV to ensure proper extraction and insertion of battery cells. The process is designed to take a few minutes depending on the implementation and is much faster than charging the existing batteries inside the BEV.

As depicted in FIG. 2, the SAVIOR framework may rely on a cloud-based control system to coordinate actions of BEVs, UAVs, and MoCSs. As depicted in FIG. 5A, the cloud-based control system 501 may include a mobility database, a provider request database, an MoCS deployment unit, and a pairing control unit. The mobility database may be a periodically-updated database that includes data about locations, destinations, and charge levels of BEVs, UAVs, and MoCS. The provider request database may be database that includes requests for providers (e.g., BEV-initiated request for battery replenishment, BEV-initiated request for discharged battery removal, UAV-initiated requests for latching to moving BEVs, MoCS-initiated request for regional relocation, and/or the like). The pairing control unit may: (i) pair BEVs and UAVs for BEV battery replenishment, (ii) pair BEVs and UAVs for discharged battery removal, and/or (iii) pair BEVs and UAVs for latching. Accordingly, the pairing control unit may provide pairing instructions to UAVs in the UAV network and to BEVs in the BEV network. The MoCS deployment unit may determine which regions to redirect MoCSs to. Accordingly, the MoCS deployment unit may provide redirection instructions to MoCS depots.

As described above, the cloud-based control system of the SAVIOR framework makes at least two major decisions: (1) where to send MoCS and (2) which BEV can support a given UAV. The first decision may be generated in accordance with the process that is depicted in FIG. 5B. As depicted in FIG. 5B, for each ith region, the cloud-based control system determines whether a charge distribution measure for the ith region (e.g., an average measure of charge ratio for BEVs in the ith region, a count of BEVs in the ith region with insufficient charge, a normalized count of BEVs in the ith region with insufficient charge, and/or the like) fails to satisfy (e.g., falls below) a charge distribution measure threshold. In some embodiments, if the cloud-based control system determines whether the charge distribution measure for the ith region fails to satisfy the charge distribution measure threshold, the cloud-based control system redirects MoCSs that are deemed sufficiently proximate to the ith region to that region. This is because MoCS are highly effective in terms of replenishing battery levels of both BEVs and UAVs but they must be present in the right location to make the transactions. In some embodiments, the charge distribution measure for a region is determined based at least in part on which BEVs are in the region and the charge levels of those BEVs, both of which may be described the mobility database associated with the cloud-based control system of the SAVIOR framework.

As described above, the cloud-based control system may further be configured to decide which BEV can support a given UAV. In some embodiments, this decision may be generated in accordance with the process that is depicted in FIG. 5C. As depicted in FIG. 5C, for each ith co-region BEV that is in the region of the given UAV, the cloud-based control system determines whether the ith co-region BEV is a suitable provider for the given UAV based at least in part on defined provider eligibility criteria. If the cloud-based control system determines that the ith co-region BEV is a suitable provider for the given UAV, the cloud-based control system schedules the pairing transaction associated with pairing the ith co-region BEV and the given UAV and generates corresponding pairing instructions. However, if the cloud-based control system determines that the ith co-region BEV is not a suitable provider for the given UAV based at least in part on defined provider eligibility criteria, then the cloud-based control system increments i to determine whether a next co-region BEV is a suitable provider for the given UAV based at least in part on defined provider eligibility criteria.

In some embodiments, a BEV is determined to be a suitable provider for a UAV if: (1) BEV is not in a critical battery state, (2) BEV is travelling in the same general direction as the UAV, and/or (3) the BEV user allows the UAV to latch. Additionally, various safety metrics can be considered when determining whether a BEV is a suitable provider for a UAV. For example, various embodiments can execute one or more safety and/or scenario checks when determining whether the BEV is a suitable provider for a UAV. Non-limiting examples of various considerations that can be made during the one or more safety and/or scenario checks include determining whether the BEV is travelling at a safe velocity, determining one or more physical conditions of the BEV (e.g., temperature), determining one or more hazardous environmental scenarios (e.g., adverse weather, wildfires, and/or the like), determining traffic levels, and/or determining travel route complexity (e.g., mountainous terrain, curvy roadways, and/or the like).

III. EXEMPLARY COMPUTING ENTITY

FIG. 4 provides a schematic of an exemplary computing entity 400 that may be used in accordance with various embodiments of the present disclosure (e.g., to perform operations of at least one component of the cloud-based control system of the SAVIOR framework). In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 420 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), 5G New Radio (5G NR), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 405 (also referred to as processors, processing circuitry, and/or similar terms used herein interchangeably) that communicate with other elements within the computing entity 400 via a bus, for example, or network connection. As will be understood, the processing element 405 may be embodied in several different ways. For example, the processing element 405 may be embodied as one or more complex programmable logic devices (CPLDs), microprocessors, multi-core processors, coprocessing entities, application-specific instruction-set processors (ASIPs), and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware, computer program products, or a combination thereof, the processing element 405 may be capable of performing steps or operations according to embodiments of the present disclosure when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 410 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 410 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 410 may also be embodied as a data storage device or devices, as a separate database server or servers, or as a combination of data storage devices and separate database servers. Further, in some embodiments, the non-volatile memory media 410 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or volatile memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 405. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 405 and operating system.

As will be appreciated, one or more of the computing entity's components may be located remotely from other computing entity components, such as in a distributed system. Furthermore, one or more of the components may be aggregated, and additional components performing functions described herein may be included in the computing entity 400. Thus, the computing entity 400 can be adapted to accommodate a variety of needs and circumstances.

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SIMULATION RESULTS

Provided in this section are the results of simulating the SAVIOR framework using the SUMO (Simulation of Urban Mobility) simulator. To simulate the SAVIOR framework, the support for "on-the-go" battery replenishment was added to SUMO. The MoCSs, BEVs and UAVs are modeled based at least in part on the standard battery vehicle class present in SUMO. The modified SUMO simulator mimics the traffic, UAV/BEV networks, and the MoCS depots. The cloud control system runs as a separate process designed with Python, and it interacts periodically with the simulation framework to convey UAV-to-BEV and MoCS insertion instructions to mimic the system proposed in FIGS. 5A-5C. The simulation step size is set to 1 second, and charge transfer is carried out in the notifyMove function of the modified MSDevice Battery class inside SUMO. All simulations were run on a 150 miles highway for 5 hours (in real-time). The BEVs weigh 2109 kg and have a battery capacity of 75 kWh (unless specifically mentioned). Each UAV was modeled to mimic a maximum travel time of 1 hour with a battery capacity of 1 kWh (unless specifically mentioned). As the UAVs are modeled using the MSDevice Battery class of SUMO, the expected energy efficiency does not match with respect to a UAV. Hence, the battery capacities of the UAVs are adjusted, so that the travel time could be approximately 1 hour. Each MoCS weigh 11793 kg (to mimic a class 6 truck) and carries an 850 kWh battery, a part of which is also used for its own operation. The top four plots in FIG. 6 illustrate the charge levels of randomly sampled BEVs during simulation. It can be observed that the charge levels of BEVs get replenished periodically by MoCS or other BEVs. The four plots of the second row in FIG. 6 illustrate the charge levels of randomly sampled UAVs and MoCS during simulation. UAVs exhibit similar trends with slightly more pronounced flatter regions (at a max charge) due to BEV-latching. MoCS constantly lose charge at a varying rate depending on how many charge transactions it is carrying out in a given period of time.

The simulation involves experiments in light traffic and heavy traffic. According to light traffic experiments, 500 BEVs are inserted at the start with 1 more added every 4 seconds. That leads to a total of 5000 BEVs inserted in 5 hours. 50 UAVs are inserted at the start with 1 more added every 40 seconds. That leads to a total of 500 UAVs inserted in 5 hours. According to heavy-traffic experiments, 2000 BEVs are inserted at the start with 1 more added every 2 seconds. That leads to a total of 11000 BEVs inserted in 5 hours. 200 UAVs are inserted at the start with 1 more added every 20 seconds. That leads to a total of 1100 UAVs inserted in 5 hours.

The experiments first vary the percentage of MoCS in the network (based at least in part on the total BEV s+UAV s) to observe the effect on the percentage of BEV and UAV halts (due to running out of charge during travel). The results are shown in FIG. 6 (the third row left two plots) for heavy and light traffic settings, respectively. SAVIOR appears to be more effective in heavy traffic than light traffic because there are more candidates for charge sharing and latching. For both light and heavy traffic, SAVIOR performs much better than standard (non-SAVIOR) environment and the effectiveness of SAVIOR increases as the percentage of MoCS in the fleet is increased. For 15% MoCS at heavy traffic, UAV halt reduces to about 5% and BEV halt reduces to below 1% (near-perpetual motion). The charge transfer rate between MoCS-to-BEV and MoCS-to-UAV was set to 10 kWh/min while BEVs share charge at a rate of 1 kWh/min.

Larger batteries in BEVs/UAVs contribute to higher GHG emission, higher weight and increased purchasing costs. The third row table of FIG. 6 illustrates the effect of reducing the battery capacities of BEVs/UAVs by a certain percentage, on the percentage of halts. For example, a BEV with a 20% reduced battery implies a battery capacity of (75 kwh*0.8=60 kwh). These experiments were carried out in light traffic settings and the charge transfer rate between MoCS-to-BEV and MoCS-to-UAV was set to 10 kWh/min while BEVs shared charge at a rate of 1 kWh/min. As depicted in FIG. 6, given 15% MoCS presence, the percentage of UAV halt increases at a steady rate but it is much lower in comparison to a standard framework. The effect on halts is even milder with a 20% MoCS fleet size.

BEVs and UAVs are not exactly GHG emission-free due to emissions from battery manufacturing and fossil fuel-driven grid electricity generation. The bottom-most plot of FIG. 6 illustrates the estimated GHG emission from different BEVs, UAVs and ICE vehicles based at least in part on previous studies. However, the inventors believe that SAVIOR can help reduce GHG if all the MoCSs are powered by solar or similar renewable energy sources. The bottom-most plot of FIG. 6 illustrates the estimated reduction in GHG emission using SAVIOR with solar-powered MoCS and MoCS depots. These values are based at least in part on an estimated 707 g $CO_2$ emission per kWh of grid energy production and 40 g $CO_2$ emission per kWh for solar energy production. The inventors estimate a reduction of more than 70% GHG emission for different BEVs and UAVs. Powering MoCS depots with solar is a more feasible solution than powering every charging station, located in crowded cities, with solar, because MoCS depots can be located outside the city limits, where obtaining space is less challenging. The SAVIOR solution is also more feasible than producing electricity entirely from green sources.

V. EXEMPLARY BATTERY REPLACEMENT TECHNIQUES

Provided in this section are additional techniques for on-the-go battery replacement. For example, FIGS. 7A-7B relate to a non-uniform battery cell replacement system that is configured to load battery cells of different sizes and capacities onto a BEV battery compartment/cabinet. It will be appreciated that, in various embodiments, the battery replacement techniques described herein can be executed autonomously by the one or more components associated with the non-uniform battery cell replacement system (e.g., the BEV, MoCS, battery cabinets, and/or the UAVs) within a matter of time that is faster relative to traditional battery charging techniques. Furthermore, the techniques described herein can provide increased efficiency to one or more existing BEV/UAV fleets that also employ smart platooning techniques in which two or more BEV/UAVs travel autonomously in a “platoon” comprising a plurality of vehicles and vehicle types (e.g., autonomous automobiles, truck, UAVs, and/or the like).

As depicted in FIG. 7A, the battery loading process comprising a UAV dropping off battery cells to a battery transporter which separates each battery and carries them to the loading ramp. This ramp contains holes of different chute sizes to match the dimensions of each battery capacity. For example, the largest battery cells are towards the left of the figure, and the smallest battery cells are towards the right. Once the battery cells fall into their corresponding chute, the battery cells are aligned correctly inside the battery compartment. FIG. 7B illustrates how spent battery cells are unloaded onto a UAV for retrieval/removal. The bottom of the battery compartment opens, and the spent battery cells fall into the ramp and battery collection station. The conveyor belt teeth catch the falling batteries and carries them upwards towards the UAV, which grabs each battery cell and stores them into its battery cell container. This process repeats until all spent batteries for a particular compartment is retrieved. In some embodiments, the battery cabinets with the most spent battery cells will always be located towards the back of the car. To ensure this property, the battery cabinets move around as indicated by the arrows in FIG. 8. There is one battery compartment slot that is left empty to allow the movement of the battery cabinets. The battery cabinet with spent battery cells is placed on the battery compartment slot that is to the right of the empty battery compartment slot. After the battery cabinet with spent battery ells is emptied out, the corresponding battery cabinet moves to the right slot and gets loaded with fresh battery cells in accordance with the process that is depicted in FIG. 7A and described above.

As another example, in some embodiments, a battery cabinet replacement system is used. Rather than replacing individual battery cells, this approach swaps out entire battery cabinets using UAVs. When a battery cabinet has spent batteries, it gets transported towards the back of the vehicle as shown in step/operation 2601 of the process that is depicted in FIG. 26. Then, the battery cabinet replacement system props up the battery compartment as shown in step/operation 2602, where the UAV can retrieve this compartment as shown in step/operation 2603. The propping mechanism then returns to its original position. The UAV brings this cabinet to an MoCS or a battery recharging center. These procedures constitute the unloading process of spent battery cabinets for the battery cabinet replacement system.

The loading process for fresh battery cabinets in accordance with the battery cabinet replacement system approach may perform in reverse of the loading process. To replenish the spent batteries, the UAV may carry a fresh battery cabinet into the back of a BEV, which is demonstrated in step/operation 2604 of the process that is depicted in FIG. 26. When the UAV is in range of a BEV in need of battery replenishment, the propping mechanism raises one of the empty cabinet slots. Once the UAV aligns the cabinet to an empty slot, the UAV detaches the battery compartment from itself (see step/operation 2605). Step/operation 2606 relates to the cabinet with fully charged batteries being lowered to its slot. The UAV may then leave the vicinity of the BEV when cabinet is successfully placed. After these procedures, this battery cabinet can now be used by the BEV during its travel.

Liquid battery technologies for replacing lithium-ion batteries are being widely researched. If BEVs make a transition to liquid batteries in future, then the SAVIOR framework can be easily extended to on-the-go refilling of key battery chemicals necessary for energy generation. Batteries that take flexible shapes and can be morphed to fit into various structures can also be used in the using the SAVIOR framework.

VI. EXEMPLARY SMART BATTERY RACK SYSTEMS

A battery rack system (e.g., used by an MoCS to store fresh batteries, used by a BEV to store fresh batteries, and/or the like) may have the architecture that is depicted in FIG. 9. As depicted in FIG. 9, the battery rack system (referred to herein as a smart battery rack system) includes a battery rack and a set of external monitoring sensors. The monitoring sensors attach to the outside walls of the battery rack and track battery health data and other relevant data, such as battery rack defects, remaining charge of the battery rack, age of the battery cells of the battery rack, number of battery cells in the battery rack, and/or the like. The battery rack and external monitoring sensors can communicate wirelessly with each other and with a centralized controller as shown in FIG. 10 and FIG. 11. The centralized controller may manage important decisions with regards to monitoring, installation, continuous operation, and unloading of the battery cells in the battery rack.

Installation of a battery cell into the battery rack may be performed in accordance with the process that is depicted in FIG. 12A. As depicted in FIG. 12A, the installation mechanism of a smart battery rack includes an installation chute and an installation ramp. The installation chute acts as the insertion point for battery cells to be installed and is implemented like a chimney of the installation mechanism with a hole at the top for battery insertion. The installation ramp receives the inserted battery cells to align them to the top of smart battery rack, namely battery cell installation checking stations. It has slot holes along the path which fits with each column of the smart battery rack. These holes can be controlled to ensure the first row of the battery rack are filled correctly.

As further depicted in FIG. 12A, the smart battery rack includes battery cells, movable entry latch doors, movable exit latch doors, battery cell installation checking stations, and a modified battery management system (BMS). After battery cells are inserted are inserted through the installation chute, battery cells fall one by on to the battery installation ramp. The ramp has alignment holes which is controlled in order to ensure one battery cell is in each of the top rows of the smart battery rack, also called the battery cell installation checking stations. Once the battery cell installation checking stations are filled with battery cells, each battery cell installation checking stations determines the battery status of the battery cell in the battery cell installation checking station. The determined battery statuses are then used by the modified BMS to determine whether to allow entry of each battery cell into the smart battery rack. If the modified BMS determines that a particular battery cell should be allowed entry, then the movable entry door latch opens, which allows the battery cell to fall into the smart battery rack as shown in FIG. 16. If the modified BMS determines that a particular battery cell should not be allowed entry, the battery cell is ejected using a spring mechanism towards the rear of the smart battery rack, as shown in FIG. 17A and FIG. 17B. Thereafter, rear doors of the smart battery rack open, and a spring mechanism pushes the denied/rejected battery cells to the unload ramp of the unload station. These cells fall into the failed cells collection to be retrieved by the installer. Therefore, after performing entry checks for one row of battery cells, the smart battery rack may have the state that is shown in FIG. 18.

As described above, the modified BMS determines whether to allow entry of each battery cell in a battery cell installation checking station into the smart battery rack based at least in part on the status of the battery cell. This determination may be performed in accordance with the process that is depicted in FIG. 13. As depicted in FIG. 13, if a battery cell is fully charged and in good health, the movable entry door latch opens, which allows these fully charged battery cells to fall into the smart battery rack. However, if the battery cell is dead, discharged, or in reverse polarity, the battery cell is ejected using a spring mechanism towards the rear of the battery rack. Accordingly, battery cells that fail the checks gets ejected towards the back to the unload station as shown in FIG. 12B, which contains a failed battery cells collection. Accordingly, in some embodiments, the modified BMS augments existing BMS designs by adding bypass switches, voltmeters, and reverse polarity protection to complement the battery cell installation checking stations as shown in FIG. 13. In some embodiments, the modified BMS monitors relevant battery cell status based at least in part on at the battery cell voltage, battery cell current, battery cell health status, and/or the like.

In some embodiments, throughout the operation of the smart battery rack, each battery cell is monitored using the modified BMS to determine if the battery is dead or discharged. The BMS check during this continuous monitoring stage (as opposed to the BMS check during the installation stage) does not include a reverse polarity as reverse polarity was checked during the installation stage. If the continuous monitoring of a battery cell of the smart battery rack shows that the battery cell is neither dead nor discharged, the battery cell will be consciously used. However, the continuous monitoring of a battery cell of the smart battery rack shows that the battery cell is dead or discharged, then the location of the battery cell is recorded, as depicted in FIG. 21. If the battery cell is discharged but not dead, then operations corresponding to recharging the battery cell are triggered. If the battery cell is dead, the switch for the battery cell bypasses the battery cell until the battery cell is replaced. In some embodiments, the modified BMS notifies the user to replace the dead battery cells. Once the user acknowledges the replacement notification, a compartment column replacement process is triggered to remove and replace the battery cells of the columns with dead cells.

An operational example of removing battery cells from a small battery rack is depicted in FIGS. 21-25. For example, as shown in FIG. 21, the second column and the fifth column include dead/discharged battery cells. In particular, FIG. 21 shows that the second column includes a dead battery cell and a discharged battery cell, while the fifth column includes two discharged battery cells. The columns that include dead/discharged battery cells are unloaded column by column via opening exit latch doors for the columns. For example, as shown in FIG. 22A, the exit latch door for the second column is first opened and the battery cells in that column are unloaded. Next, as shown in FIG. 22B, the exit latch door for the fifth column is next opened and the battery cells in that column are unloaded. Accordingly, after the unloading operations performed in FIGS. 22A-22B, as shown in FIG. 22C, the smart battery rack has the state that is depicted in FIG. 22C. Moreover, as depicted in FIG. 23, unloaded battery cells then fall on a battery cell unloading ramp, which then allows the battery cells to fall through a battery cell unload chute into a battery cell collection system. After all columns with problematic cells are unloaded, the latch doors returned to their original position as shown in FIG. 22C. At this point, the installation procedure is used to refill the now empty columns of the smart battery rack.

In some embodiments, to unload battery cells, the smart rack performs this operation on one column with one or more problematic battery cells at a time. If there are one or more columns with problematic cells to be unloaded, this replacement operation may be performed in accordance with a compartment column replacement process, depicted in the bottom right flowchart of FIG. 20. In accordance with the compartment column replacement process, battery usage is halted, and the modified BMS identifies the columns with dead and spent battery cells as shown in FIG. 23. In some embodiments, each target column for removal is unloaded as shown in FIG. 24 until all dead and spent batteries are unloaded. The entry and exit door latches may be opened to unload the battery cells of the column into the battery cell unload ramp down to the battery cell unload chute. Afterward, in some embodiments, a battery cell collection system retrieves the unloaded cells. Once all the problematic cells are unloaded, the latch doors return to their original positions as shown in FIG. 25. Afterwards, the user can then install batteries using the same installation procedure, and the battery usage is restarted again. In some embodiments, the column replacement process can be applied to all the columns to replace all the battery cells.

VII. CONCLUSION

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A computer-implemented method for optimal on-the-go electric vehicle battery replacement for a battery electric vehicle (BEV) in a BEV network, the computer-implemented method comprising:

identifying, using one or more processors, an unmanned aerial vehicle (UAV) network comprising one or more UAVs;

determining, using the one or more processors, a selected UAV in the UAV network to pair with the BEV network; and providing, using the one or more processors, pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells, wherein performing the one or more battery replacement operations by the selected UAV comprises:

removing the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and causing the one or more fresh battery cells to be installed into the particular battery cabinet that is in the empty battery compartment slot of the BEV.

2. The computer-implemented method of claim 1, wherein performing the automated navigation operations by the selected UAV comprises:

identifying a co-trip BEV in the BEV network: (i) that has a threshold-satisfying charging state, (ii) that is traveling in a general direction associated with the travel, and (iii) whose operator has agreed to a latching pairing with the selected UAV;

causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

3. The computer-implemented method of claim 1, further comprising:

determining, using the one or more processors, whether a charging distribution measure for the geographic region fails to satisfy a charging distribution measure threshold; and in response to determining that the charging distribution measure for the geographic region fails to satisfy the charging distribution measure threshold, redirecting, using the one or more processors, one or more mobile charging stations to the geographic region.

4. The computer-implemented method of claim 1, wherein installing the one or more fresh battery cells comprises inserting the one or more fresh battery cells into a common installation chute.

5. The computer-implemented method of claim 1, wherein installing the one or more fresh battery cells comprises inserting a fresh battery cell into a sized installation chute that is associated with a size of the fresh battery cell.

6. The computer-implemented method of claim 1, wherein performing the one or more battery replacement operations by the selected UAV comprises:

removing a dead/discharged battery cabinet that is in an extraction battery compartment slot of the BEV; and causing a new battery cabinet to be installed into an insertion battery compartment slot of the BEV.

7. The computer-implemented method of claim 1, wherein the BEV stores battery cells using a smart battery rack system.

8. An apparatus for optimal on-the-go electric vehicle battery replacement for a battery electric vehicle (BEV) in a BEV network, the apparatus comprising at least one processor and at least one non-transitory memory comprising a computer program code, the at least one non-transitory memory and the computer program code being configured to, with the at least one processor, cause the apparatus to:

identify an unmanned aerial vehicle (UAV) network comprising one or more UAVs;

determine a selected UAV in the UAV network to pair with the BEV network;

provide pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells;

identifying a co-trip BEV in the BEV network: (i) that has a threshold-satisfying charging state, (ii) that is traveling in a general direction associated with the travel, and (iii) whose operator has agreed to a latching pairing with the selected UAV;

causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

9. The apparatus of claim 8, wherein the at least one non-transitory memory and the computer program code are further configured to, with the at least one processor, cause the apparatus to:

determine whether a charging distribution measure for the geographic region fails to satisfy a charging distribution measure threshold; and in response to determining that the charging distribution measure for the geographic region fails to satisfy the charging distribution measure threshold, redirect one or more mobile charging stations to the geographic region.

10. The apparatus of claim 8, wherein performing the one or more battery replacement operations by the selected UAV comprises:

removing the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and causing the one or more fresh battery cells to be installed into the particular battery cabinet that is in the empty battery compartment slot of the BEV.

11. The apparatus of claim 10, wherein installing the one or more fresh battery cells comprises inserting the one or more fresh battery cells into a common installation chute.

12. The apparatus of claim 10, wherein installing the one or more fresh battery cells comprises inserting fresh battery cell into a sized installation chute that is associated with a size of the fresh battery cell.

13. The apparatus of claim 8, wherein performing the one or more battery replacement operations by the selected UAV comprises:

removing a dead/discharged battery cabinet that is in an extraction battery compartment slot of the BEV; and causing a new battery cabinet to be installed into an insertion battery compartment slot of the BEV.

14. The apparatus of claim 8, wherein the BEV stores battery cells using a smart battery rack system.

15. A computer program product for optimal on-the-go electric vehicle battery replacement for a battery electric vehicle (BEV) in a BEV network, the computer-readable program code portions comprising an executable portion configured to:

identify an unmanned aerial vehicle (UAV) network comprising one or more UAVs;

determine a selected UAV in the UAV network to pair with the BEV network; and provide pairing instructions to the selected UAV, wherein the pairing instructions are configured to cause the selected UAV to: (i) perform automated navigation operations corresponding to a travel to a geographic region associated with the BEV, and (ii) performing one or more battery replacement operations to replace one or more dead/discharged battery cells of the BEV with one or more fresh battery cells, wherein performing the one or more battery replacement operations by the selected UAV comprises program code instructions to:

remove the one or more dead/discharged battery cells from a particular battery cabinet that is in an extraction battery compartment slot of the BEV, wherein removing the one or more dead/discharged battery cells causes the particular battery cabinet to shift to an empty battery compartment slot of the BEV; and cause the one or more fresh battery cells to be installed into the particular battery cabinet that is in the empty battery compartment slot of the BEV.

16. The computer program product of claim 15, wherein performing the automated navigation operations by the selected UAV comprises:

identifying a co-trip BEV in the BEV network: (i) that has a threshold-satisfying charging state, (ii) that is traveling in a general direction associated with the travel, and (iii) whose operator has agreed to a latching pairing with the selected UAV;

causing the selected UAV to latch onto a charging pad of the co-trip BEV until the co-trip BEV is within a threshold proximity of the BEV; and after the co-trip BEV is within the threshold proximity of the BEV, causing the selected UAV to travel from a location of the co-trip BEV to a location of the BEV.

17. The computer program product of claim 15, wherein the executable portion is further configured to:

determine whether a charging distribution measure for the geographic region fails to satisfy a charging distribution measure threshold; and in response to determining that the charging distribution measure for the geographic region fails to satisfy the charging distribution measure threshold, redirect one or more mobile charging stations to the geographic region.

* * * * *